(12) United States Patent
Shen et al.

(10) Patent No.: US 11,108,606 B2
(45) Date of Patent: Aug. 31, 2021

(54) SIDE INFORMATION TRANSMISSION METHOD, SIDE INFORMATION RECEPTION METHOD, TRANSMITTER AND RECEIVER

(71) Applicant: Vivo Mobile Communication Co., Ltd., Guangdong (CN)

(72) Inventors: Xiaodong Shen, Guangdong (CN); Xiaodong Sun, Guangdong (CN); Yu Ding, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 111 days.

(21) Appl. No.: 16/478,803

(22) PCT Filed: Dec. 29, 2017

(86) PCT No.: PCT/CN2017/119823
§ 371 (c)(1),
(2) Date: Jul. 17, 2019

(87) PCT Pub. No.: WO2018/133650
PCT Pub. Date: Jul. 26, 2018

(65) Prior Publication Data
US 2020/0112467 A1    Apr. 9, 2020

(30) Foreign Application Priority Data

Jan. 17, 2017   (CN) .......................... 201710031854.X

(51) Int. Cl.
*H04W 4/00*   (2018.01)
*H04L 27/26*   (2006.01)
(Continued)

(52) U.S. Cl.
CPC ........ *H04L 27/2615* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS 7,113,523 B1   9/2006  Kubota et al.
8,458,343 B2 *  6/2013  Altmann ............... H04L 1/1607
                                                  709/228

(Continued)

FOREIGN PATENT DOCUMENTS

CN       1433169 A    7/2003
CN    101340417 A    1/2009
(Continued)

OTHER PUBLICATIONS

International Search Report Application No. PCT/CN2017/119823 reported on Feb. 1, 2018.
(Continued)

*Primary Examiner* — Gerald A Smarth
(74) *Attorney, Agent, or Firm* — von Briesen & Roper, s.c.

(57) ABSTRACT

The present disclosure provides a side information transmission method, a side information reception method, a transmitter and a receiver. The side information transmission method includes: transmitting side information to the receiver on a physical control channel; and transmitting a scrambled data signal to the receiver on a physical data channel. The side information is used to indicate a scrambling mode of the data signal.

20 Claims, 10 Drawing Sheets

(51) Int. Cl.
*H04L 5/00* (2006.01)
*H04L 5/10* (2006.01)
*H04W 72/04* (2009.01)

(52) U.S. Cl.
CPC ...... *H04L 27/2607* (2013.01); *H04L 27/2621* (2013.01); *H04W 72/0413* (2013.01)

(56) References Cited

U.S. PATENT DOCUMENTS

| | | | |
|---|---|---|---|
| 9,935,732 B2* | 4/2018 | Ljung | H04W 4/70 |
| 2002/0012360 A1* | 1/2002 | Olivieri | H03M 13/35 |
| | | | 370/473 |
| 2006/0098749 A1* | 5/2006 | Sung | H04L 27/2655 |
| | | | 375/260 |
| 2008/0254785 A1 | 10/2008 | Lazaridis et al. | |
| 2011/0029677 A1 | 2/2011 | Altmann | |
| 2011/0090972 A1 | 4/2011 | Jong-Seon et al. | |
| 2011/0092241 A1* | 4/2011 | Kawai | H04B 7/0404 |
| | | | 455/509 |
| 2012/0113962 A1* | 5/2012 | Jen | H04L 5/0053 |
| | | | 370/336 |
| 2012/0320859 A1 | 12/2012 | Ahn et al. | |
| 2013/0012255 A1* | 1/2013 | Kim | H04W 52/42 |
| | | | 455/522 |
| 2014/0105121 A1 | 4/2014 | Jose et al. | |
| 2015/0016361 A1* | 1/2015 | Kim | H04J 11/004 |
| | | | 370/329 |
| 2015/0023194 A1* | 1/2015 | Seo | H04L 1/0027 |
| | | | 370/252 |
| 2016/0345033 A1* | 11/2016 | Kwak | H04N 21/6437 |
| 2017/0171866 A1* | 6/2017 | Cheng | H04W 72/0426 |
| 2017/0325236 A1 | 11/2017 | Yu | |
| 2018/0041369 A1* | 2/2018 | Moon | H04L 1/0041 |
| 2018/0167821 A1* | 6/2018 | Seok | H04L 27/2602 |
| 2021/0022117 A1* | 1/2021 | Yi | H04L 5/0048 |

FOREIGN PATENT DOCUMENTS

| | | |
|---|---|---|
| CN | 101370204 A | 2/2009 |
| CN | 102238126 A | 11/2011 |
| CN | 102484557 A | 5/2012 |
| CN | 102835087 A | 12/2012 |
| CN | I02835087 A | 12/2012 |
| CN | 104737595 A | 6/2015 |
| WO | WO 2015/081169 A1 | 6/2015 |
| WO | WO 2016119440 A1 | 8/2016 |
| WO | WO 2018119440 A1 | 8/2016 |

OTHER PUBLICATIONS

International Search Report related to Application No. PCT/CN2017/119823 reported on Feb. 1, 2018.
Chinese First Office Action for Application No. 201710031854.X; reported on Apr. 24, 2020.
Extended European Search Report related to Application No. 17892232.4 reported on Dec. 11, 2019.
Chinese Office Action for related Chinese Application No. 201710031854.X; reported on Sep. 9, 2020.

* cited by examiner

| load | K | N | PAPR | load | K | N | PAPR |
|---|---|---|---|---|---|---|---|
| 10% | 1 | 2 | 3.35 | 80% | 1 | 2 | 0.41 |
| | 1 | 4 | 3.37 | | 1 | 4 | 0.45 |
| | 2 | 2 | 4.14 | | 2 | 2 | 3.58 |
| | 2 | 4 | 4.15 | | 2 | 4 | 3.58 |
| | 4 | 2 | 5.34 | | 4 | 2 | 4.39 |
| | 4 | 4 | 5.86 | | 4 | 4 | 4.43 |
| 50% | 1 | 2 | 0.71 | | | | |
| | 1 | 4 | 0.69 | | | | |
| | 2 | 2 | 3.31 | | | | |
| | 2 | 4 | 3.37 | | | | |
| | 4 | 2 | 4.09 | | | | |
| | 4 | 4 | 4.06 | | | | |

SIDE INFORMATION TRANSMISSION METHOD, SIDE INFORMATION RECEPTION METHOD, TRANSMITTER AND RECEIVER

CROSS-REFERENCE TO RELATED APPLICATION

This Application is a 35 USC 371 US National Stage filing of International Application No. PCT/CN2017/119823 filed on Dec. 29, 2017, and claims priority under the Chinese Patent Application No. 20170031854.X filed on Jan. 17, 2017.

TECHNICAL FIELD OF THE DISCLOSURE

The present disclosure relates to the field of communication technology, in particular to a side information transmission method, a side information reception method, a transmitter and a receiver.

BACKGROUND OF THE DISCLOSURE

As a Multi-Carrier Modulation (MCM) technique, a core concept of an Orthogonal Frequency Division Multiplexing (OFDM) technique lies in dividing a channel into a plurality of orthogonal sub-channels and performing narrow-band modulation and transmission on each sub-channel, so as to reduce mutual interference among the sub-channels. A signal bandwidth on each sub-channel is smaller than an associated bandwidth of the channel, so there is a flat frequency selective fading property for each sub-channel, and the inter-symbol interference is remarkably weakened. In addition, in an OFDM system, carriers for the sub-channels are orthogonal to each other, so the resultant spectra overlap each other. In this regard, it is able to reduce the mutual interference among sub-carriers, and improve the spectrum utilization. In the sub-channels, the orthogonal modulation and demodulation may be achieved through Inverse Fast Fourier Transform (IFFT) and Fast Fourier Transform (FFT).

The OFDM system is capable of providing a larger coverage range, better transmission quality, a higher data rate as well as higher spectrum efficiency. However, each OFDM symbol is acquired through superimposing a plurality of independent, modulated sub-carrier signals. When the sub-carriers have a same or similar phase, an overlapped signal may be modulated by a signal with a same initial phase, resulting in a large instantaneous power peak and thereby a large Peak-to-Average Power Ratio (PAPR).

In the related art, there are mainly two methods for reducing the PAPR, i.e., Selective Lapping (SLM) and Partial Transmit Sequence (PTS). However, in the two methods, it is difficult for a transmitter to reliably notify a receiver of a scrambling mode of a data signal.

SUMMARY OF THE DISCLOSURE

An object of the present disclosure is to provide a side information transmission method, a side information reception method, a transmitter and a receiver, so as to enable the transmitter to reliably notify the receiver of a scrambling mode of a data signal.

In one aspect, the present disclosure provides in some embodiments a side information transmission method for use in a transmitter, including: transmitting side information to a receiver on a physical control channel; and transmitting a scrambled data signal to the receiver on a physical data channel. The side information is used to indicate a scrambling mode of the data signal.

In another aspect, the present disclosure provides in some embodiments a side information reception method for use in a receiver, including: receiving side information transmitted from a transmitter on a physical control channel; receiving a scrambled data signal transmitted from the transmitter on a physical data channel; determining a scrambling mode corresponding to the side information in accordance with a predetermined mapping relationship between side information and scrambling modes; and descrambling the data signal in accordance with the scrambling mode corresponding to the side information.

In yet another aspect, the present disclosure provides in some embodiments a transmitter, including: a side information transmission module configured to transmit side information to a receiver on a physical control channel; and a data signal transmission module configured to transmit a scrambled data signal to the receiver on a physical data channel. The side information is used to indicate a scrambling mode of the data signal.

In still yet another aspect, the present disclosure provides in some embodiments a receiver, including: a side information reception module configured to receive side information transmitted from a transmitter on a physical control channel; a data signal reception module configured to receive a scrambled data signal transmitted from the transmitter on a physical data channel; a third scrambling mode determination module configured to determine a scrambling mode corresponding to the side information in accordance with a predetermined mapping relationship between side information and scrambling modes; and a descrambling module configured to descramble the data signal in accordance with the scrambling mode corresponding to the side information.

In still yet another aspect, the present disclosure provides in some embodiments a transmitter, including a memory, a processor, and a computer program stored in the memory and executed by the processor. The processor is configured to execute the computer program so as to implement the above-mentioned side information transmission method.

In still yet another aspect, the present disclosure provides in some embodiments a receiver, including a memory, a processor, and a computer program stored in the memory and executed by the processor. The processor is configured to execute the computer program so as to implement the above-mentioned side information reception method.

In still yet another aspect, the present disclosure provides in some embodiments a computer-readable storage medium storing therein a computer program. The computer program is executed by a processor so as to implement the above-mentioned side information transmission method.

In still yet another aspect, the present disclosure provides in some embodiments a computer-readable storage medium storing therein a computer program. The computer program is executed by a processor so as to implement the above-mentioned side information reception method.

According to the embodiments of the present disclosure, the transmitter may transmit the side information to the receiver on the physical control channel, and transmit the scrambled data signal to the receiver on the physical data channel. The side information is used to indicate the scrambling mode of the data signal. As a result, it is able for the transmitter to reliably notify the receiver of the scrambling mode of the data signal.

BRIEF DESCRIPTION OF THE DRAWINGS

In order to illustrate the technical solutions of the present in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE DISCLOSURE

Schemes of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
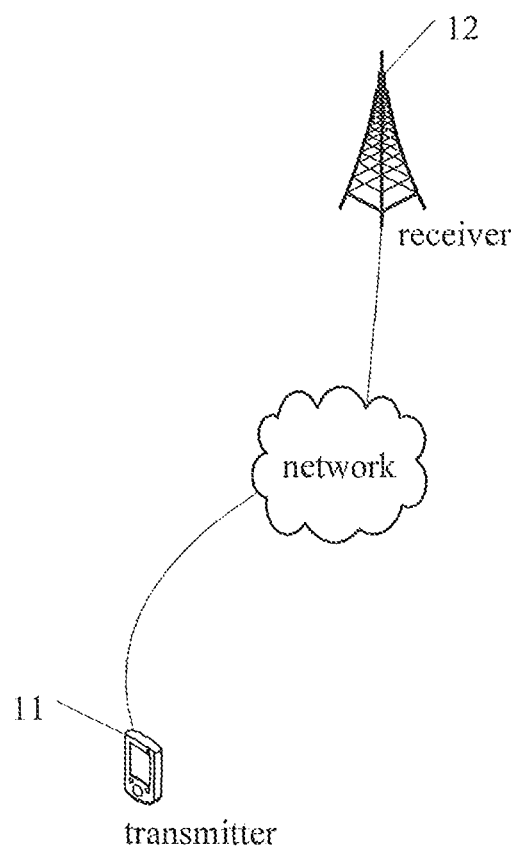
FIG. 1 is a schematic view showing an applicable communication system according to some embodiments of the present disclosure.

FIG. 1 shows a communication system to which the scheme in the embodiments of the present disclosure is applicable. As shown in FIG. 1, the communication system may include a transmitter 11 and a receiver 12. The transmitter 11 may be a device for transmitting a data signal, and the receiver 12 may be a device for receiving the data signal transmitted from the transmitter 11. For example, for an uplink signal, the transmitter 11 may be a User Equipment (UE) and the receiver 12 may be a network side device; and for a downlink signal, the transmitter 11 may be a network side device and the receiver 12 may be a UE. It should be appreciated that, in some scenarios where, for example, data is transmitted between UEs, the transmitter 11 and the receiver 12 may each be a UE; and in some scenarios where, for example, data is transmitted between the network side devices, the transmitter 11 and the receiver 12 may each be a network side device, which will not be particularly defined herein. In the drawings, the transmitter 11 may be the UE and the receiver 12 may be the network side device. In the embodiments of the present disclosure, the UE may be a mobile phone, a tablet personal computer, a laptop computer, a Personal Digital Assistant (PDA), a Mobile Internet Device (MID) or a wearable device. The network side device may be a base station (e.g., a macro base station such as an evolved Node B (eNB) in a Long Term Evolution (LTE) system, a New Radio (NR) or a Node B (NB) in a $5^{th}$-Generation (5G) system, a Transmission Reception Point (TRP), or an Access Point (AP). It should be further appreciated that, the types of the UE and the network side device will not be particularly defined herein.

Figure 2:
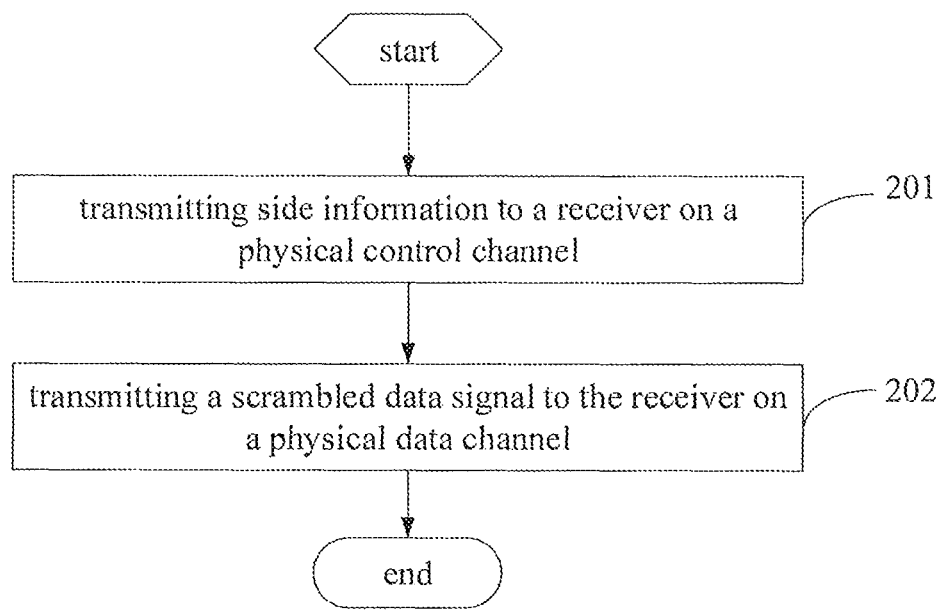
FIG. 2 is a flow chart of a side information transmission method according to some embodiments of the present disclosure.

The present disclosure provides in some embodiments a side information transmission method which, as shown in FIG. 2, includes the following steps.

Step 201: transmitting side information to a receiver on a physical control channel.

The physical control channel may be a physical layer channel for transmitting control-related information. The side information may be transmitted on the physical control channel, so as to prevent the transmission of a data signal from being adversely affected, thereby to improve the transmission performance.

Step 202: transmitting a scrambled data signal to the receiver on a physical data channel.

The side information may be used to indicate a scrambling mode of the data signal.

The physical data channel may be a physical layer channel for the data transmission. In addition, the scrambled data signal may include one or more scrambled data signal blocks, and the scrambling modes of different data signal blocks may be the same or different from each other. The side information may be used to indicate the scrambling mode of each scrambled data signal block transmitted in Step 202. In other words, when one data signal block is transmitted in Step 202, the side information may indicate the scrambling mode of the data signal block. When a plurality of data signal blocks is transmitted in Step 202, the side information may indicate the scrambling modes of the plurality of data signal blocks. In addition, in the embodiments of the present disclosure, how to indicate the scrambling mode of the data signal will not be particularly defined herein. For example, a transmitter may pre-agree with the receiver to determine an indication mode or indication rule.

In addition, in the embodiments of the present disclosure, the scrambling mode of the data signal may be selected by the transmitter from a plurality of scrambling modes. In other words, prior to Step 202, the receiver may select an appropriate scrambling mode for each data signal, so as to reduce a PARP for a data transmission system.

It should be appreciated that, in the embodiments of the present disclosure, a time-domain resource occupied by the physical control channel may be the same as a time-domain resource occupied by the physical data signal, i.e., the side information and the data signal may be transmitted to the receiver simultaneously. It should be appreciated that, the time-domain resource occupied by the physical control channel and the time-domain resource occupied by the physical data signal may be continuous or discontinuous time-domain resources in a same time-domain resource element. The time-domain resource element may be a frame, subframe or timeslot, which will not be particularly defined herein.

It should be appreciated that, an order of Steps 201 and 202 will be particularly defined herein. For example, Step 201 may be performed prior to or subsequent to Step 202, or Steps 201 and 202 may be performed simultaneously.

According to the side information transmission method in the embodiments of the present disclosure, the transmitter may transmit the side information to the receiver on the physical control channel, and transmit the scrambled data signal to the receiver on the physical data channel. The side information may be used to indicate the scrambling mode of the data signal. As a result, it is able for the transmitter to reliably notify the receiver of the scrambling mode of the data signal. In addition, the receiver may descramble the data signal in accordance with the scrambling mode indicated by the side information, so it is able to reduce the PAPR for the data transmission system.

Figure 3:
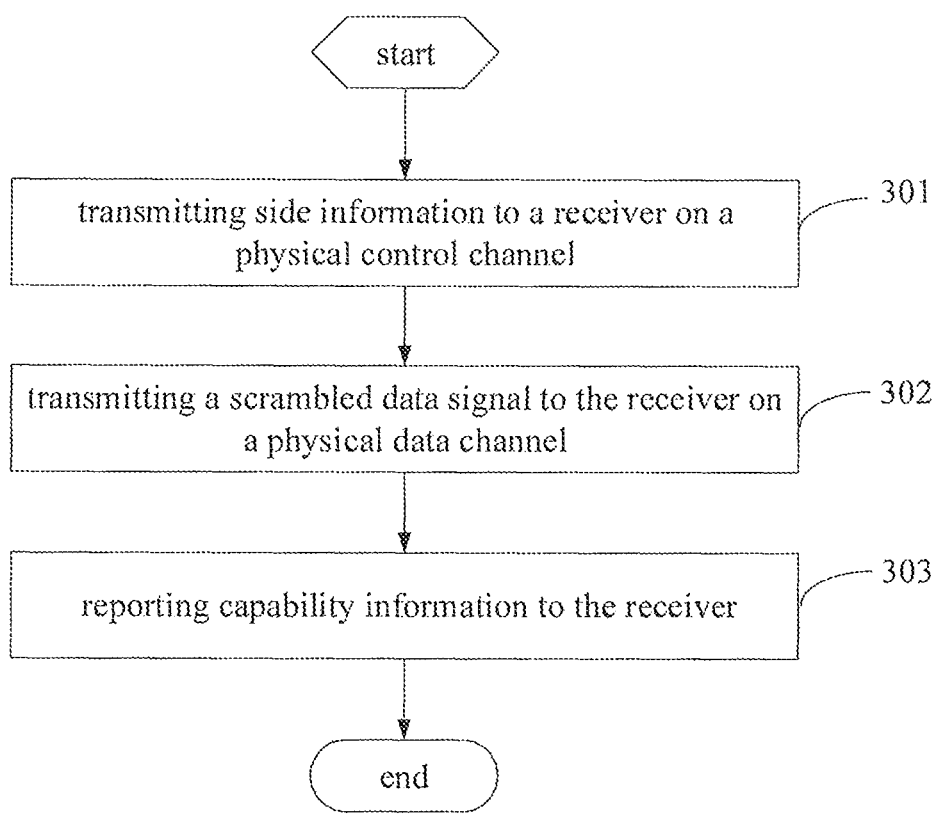
FIG. 3 is a flow chart of another side information transmission method according to some embodiments of the present disclosure.

The present disclosure further provides in some embodiments a side information transmission method for use in a transmitter which, as shown in FIG. 3, includes the following steps.

Step 301: transmitting side information to a receiver on a physical control channel.

The physical control channel may be a channel for transmitting control-related information. The side information may be transmitted on the physical control channel, so as to prevent the transmission of a data signal from being adversely affected, thereby to improve the transmission performance.

Step 302: transmitting a scrambled data signal to the receiver on a physical data channel.

The side information may be used to indicate a scrambling mode of the data signal.

In a possible embodiment of the present disclosure, the step of transmitting the scrambled data signal to the receiver on the physical data channel may include: dividing initial data into K data signal blocks, each data signal block corresponding to N different phase rotations, K and N being each a positive integer; selecting a phase rotation for each data signal block from the N different phase rotations; scrambling the K data signal blocks in accordance with the phase rotation for each data signal block, so as to acquire K scrambled data signal blocks; and transmitting the K scrambled data signal blocks to the receiver in a frequency-division multiplexing manner on the physical data channel. The side information may be used to indicate the scrambling mode of each of the K scrambled data signal blocks and indicate that no phase rotation is performed on the side information.

When each data signal block corresponds to N different phase rotations, one of the N different phase rotations may be selected for each data signal block. When the phase rotation for each data signal block is selected from the N different phase rotations for each data signal block, one phase rotation may be selected from the N different phase rotations for each data signal block.

Figure 4:
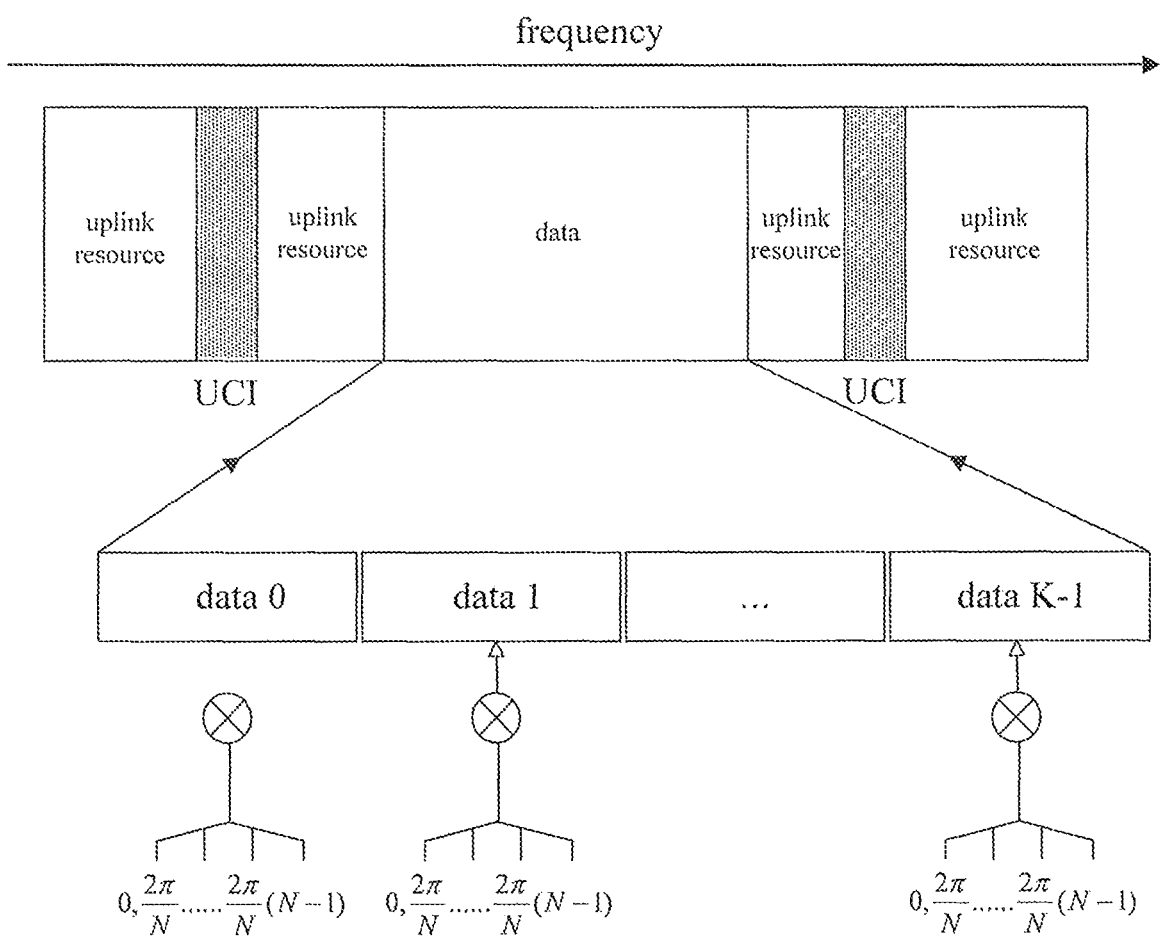
FIG. 4 is a schematic view showing data division in the embodiment of FIG. 3.

During the implementation, the initial data may be divided into K data signal blocks. For example, as shown in FIG. 4, a carrier (e.g., a subcarrier tone) of the initial data may be divided into K portions, i.e., K data signals, and each data signal may correspond to N different phase rotations, e.g., $$0, \frac{2\pi}{N} \ldots \ldots \frac{2\pi}{N}(N-1).$$

In other words, one of the N different phase rotations may be selected for each data signal. It should be appreciated that, the N different phase rotations corresponding to different data signal blocks may be spaced apart from each other at a regular interval or irregular intervals. During the selection of the phase rotation for each data signal block, the phase rotation may be selected from the N different phase rotations corresponding to the data signal block. In addition, the side information may be carried in Uplink Control Indication (UCI).

In this regard, the side information may be used to indicate the scrambling modes of the K data signal blocks through K*log 2(N) (i.e., K*log$_2$N) bits. The receiver may acquire the scrambling mode of each data signal in the K data signal blocks in accordance with the side information, so as to descramble the K data signal blocks.

Figures 5, 6A:
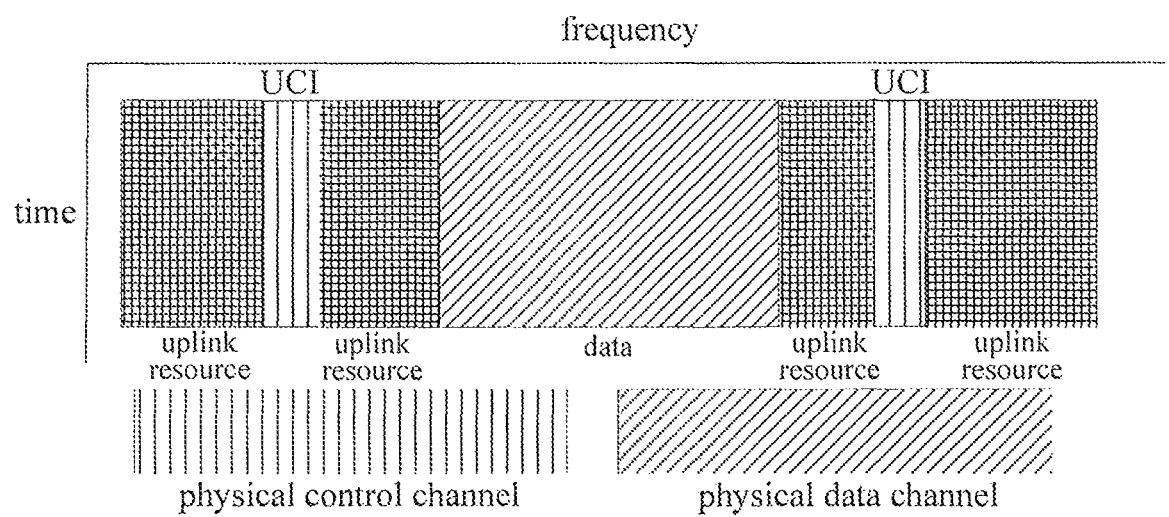
FIG. 5 is a diagram showing PAPRs in the embodiment of FIG. 3.
FIG. 6a is a schematic view showing the occupation of frequency resources in the embodiment of FIG. 3.

In addition, in the embodiments of the present disclosure, when the initial data is divided into K data signal blocks, it is able to further reduce the PAPR for the data transmission system. For example, when a bandwidth is 20 MHz, a subcarrier interval is 15 kHz, and the side information is distributed at two ends of the data signal and occupies two Resource Blocks (RBs), values of K, N and PAPR may be showed in FIG. 5. As shown in FIG. 5, when K=2, a gain greater than 3 dB may be achieved. The gain may not increase obviously when the value of N increases, so N may be 2. In a possible embodiment of the present disclosure, K=2 and N=2, so as to make a balance between the reduction in the PAPR for the data transmission system and the complexity. At this time, the gain may be about 3.5 dB to 4 dB, which is equivalent to that the power is increased by about 2.5 times. In addition, the side information may be indicated through merely 2 bits, so it is able to reduce the signaling overhead.

In addition, in the embodiments of the present disclosure, when the phase rotation is selected from the N different phase rotations for each data signal block, a phase rotation corresponding to a minimum PAPR of the data signal may be selected from the N different phase rotations for each data signal block, so as to further reduce the PAPR. The step of scrambling the K data signal blocks in accordance with the phase rotation for each data signal block may include: acquiring a phase rotation sequence of the phase rotations for each data signal block, and scrambling each data signal block in accordance with the acquired phase rotation sequence; or scrambling each data signal block in accordance with the scrambling mode corresponding to the phase rotation for each data signal block. Here, the side information may be phase rotation indication information of each data signal block, and it may be used to indicate the phase rotation sequence for each data signal block, so as to indicate the scrambling mode of each data signal block, thereby to enable the receiver to performing a descrambling process. For example, the transmitter may determine a phase rotation sequence number corresponding to the phase rotation sequence for each data signal block in accordance with a predetermined correspondence between phase rotation sequence numbers and phase rotation sequences, and encode the determined phase rotation sequence number, so as to acquire the side information carrying the determined phase rotation sequence number.

In a possible embodiment of the present disclosure, the step of transmitting the side information to the receiver on the physical control channel may include transmitting control information to the receiver on the physical control channel. The control information may at least include the side information.

In the embodiments of the present disclosure, the side information may be transmitted to the receiver through the control information, so it is unnecessary to modify or adjust a transmission mechanism or protocol between the receiver and the transmitter, e.g., it is unnecessary to transmit the side information via any other signaling. As a result, it is able to reduce the power consumption.

In a possible embodiment of the present disclosure, the control information may be UCI on which no phase rotation is performed.

Because no phase rotation is performed on the UCI, it is unnecessary to transmit relevant indication information indicating the phase rotation, and thereby it is able to reduce the signaling overhead. In addition, when no phase rotation is performed, it is able to reduce the quantity of blind detection operations made by the receiver.

In a possible embodiment of the present disclosure, the transmitting the control information to the receiver on the physical control channel may include: transmitting the control information to the receiver through the physical control channel on frequency-domain resources at both sides of a frequency-domain resource occupied by the physical data channel; or transmitting the control information to the receiver through the physical control channel on frequency-domain resources at one side of the frequency-domain resource occupied by the physical data channel.

In the embodiments of the present disclosure, the physical data signal may be the physical data channel for the transmission of the data signal, i.e., the physical data channel transmitted in Step 302.

In the embodiments of the present disclosure, the control information may be transmitted through the frequency-domain resources at the two sides of the frequency-domain resource occupied by the physical data channel, so as to increase the transmission performance of the control information. In addition, the control information may be transmitted through the frequency-domain resources at one side of the frequency-domain resource occupied by the physical data channel, so as to reduce the resources.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

Figure 6B:
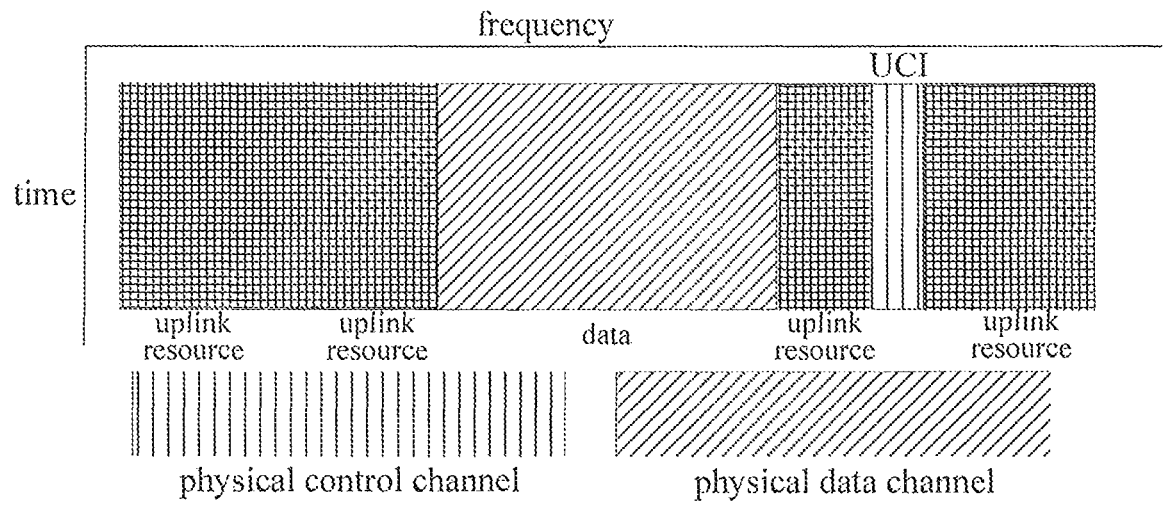
FIG. 6b is another schematic view showing the occupation of frequency resources in the embodiment of FIG. 3.

For example, as shown in FIGS. 6a and 6b, the frequency-domain resource occupied by the physical data channel may be spaced apart from the frequency-domain resource occupied by the physical control channel by an uplink frequency-domain resource. Here, the uplink frequency-domain resource may be called as an uplink resource for short. In addition, in the embodiments of the present disclosure, the time-domain resource occupied by the physical data signal may be the same as the time-domain resource occupied by the physical control channel, i.e., the control information and the data signal may be transmitted to the receiver simultaneously, so as to improve the transmission efficiency. Furthermore, the frequency-domain resource occupied by the physical control channel may be a sub-band, i.e., the physical control channel may occupy one or more sub-bands so as to transmit the side information.

In a possible embodiment of the present disclosure, the side information may include phase rotation indication information of the data signal, and the phase rotation indication information may be used to indicate the scrambling mode of the data signal.

The phase rotation indication information may include a bit stream, e.g., K*log 2(N) (i.e., $K*\log_2 N$) bits. In addition, the phase rotation indication information may be used to indicate the scrambling mode of one or K scrambled data signal blocks. In other words, the receiver may determine the scrambling mode of the one or K scrambled data signal blocks in accordance with the phase rotation indication information, and then descramble the one or K scrambled data signal blocks in accordance with the determined scrambling mode, so as to acquire the initial data. Here, the data signal may be scrambled in accordance with the phase rotation sequence for the data signal, and the phase rotation indication information may be used to indicate the phase rotation sequence, e.g., the phase rotation sequence number, so as to enable the receiver to determine the phase rotation sequence of the data signal in accordance with the phase rotation indication information, thereby to descramble the data signal. Alternatively, the data signal may be scrambled in accordance with the scrambling mode corresponding to the phase rotation, and the phase rotation indication information may be used to indicate the phase rotation, e.g., a phase rotation indicator, so as to enable the receiver to determine the phase rotation for the data signal in accordance with the phase rotation indication information, determine the scrambling mode of the data signal in accordance with the phase rotation, and descramble the data signal.

In a possible embodiment of the present disclosure, prior to transmitting the control information to the receiver on the physical control channel, the side information transmission method may further include: determining the scrambling mode of the data signal; and determining the phase rotation indication information indicating the scrambling mode of the data signal in accordance with a predetermined mapping relationship between the scrambling modes and the phase rotation indication information.

In the embodiments of the present disclosure, the phase rotation indication information of the data signal may be determined in accordance with the mapping relationship, so as to reliably notify the receiver of the scrambling mode of the data signal. The scrambling mode of the data signal may be determined before or after the data signal has been scrambled, or during a period of scrambling the data signal. In addition, in the embodiments of the present disclosure, a scrambling mode with a minimum PAPR may be selected from a plurality of supported scrambling modes so as to scramble each data signal, thereby to reduce the PAPR for the transmission system.

In a possible embodiment of the present disclosure, the step of transmitting the side information to the receiver on the physical control channel may include transmitting a reference signal to the receiver on the physical control channel, and the reference signal may at least include the side information.

In the embodiments of the present disclosure, the side information may be transmitted to the receiver through the reference signal, so it is unnecessary to modify or adjust the transmission mechanism or protocol between the receiver and the transmitter, e.g., it is unnecessary to transmit the side information through any other signaling. As a result, it is able to reduce the power consumption.

In a possible embodiment of the present disclosure, the reference signal may be a Demodulation Reference Signal (DMRS).

It should be appreciated that, in the embodiments of the present disclosure, the reference signal may alternatively be another reference signal other than DMRS, which will not be particularly defined herein.

In a possible embodiment of the present disclosure, the side information may include cyclic shift information implicitly indicating the scrambling mode of the data signal.

Identically, the cyclic shift information may be used to indicate the scrambling mode of one or K data signals. Because the scrambling mode of the data signal is indicated by the cyclic shift information in the reference signal, it is unnecessary to modify or adjust the transmission mechanism or protocol between the receiver and the transmitter, e.g., it is unnecessary to transmit the side information through any other signaling. As a result, it is able to reduce the power consumption. For example, in a scenario where the initial data is divided into K data signal blocks, when K=N=2, the cyclic shift information may have a value selected from $a_1$, $a_2$, $a_3$ and $a_4$, so as to indicate the scrambling mode of the data signal block. In addition, the receiver may receive the cyclic shift information in a blind detection manner, so as to determine the scrambling mode of the data signal and descramble the data signal.

In addition, in the scenario where the initial data is divided into K data signal blocks, each data signal block may be transmitted through one carrier (tone), so there is a relationship between the cyclic shift information in the DMRS for the physical control channel and the scrambling between the carriers for the physical data channel, i.e., the cyclic shift information in the DMRS may be used to indicate the scrambling between the carriers for the physical data channel to the receiver.

In addition, an uplink data signal may be further scrambled, and then transmitted through a cyclic prefix orthogonal frequency-division multiplexing waveform, so as to effectively reduce the PAPR.

In a possible embodiment of the present disclosure, prior to transmitting the reference signal to the receiver on the physical control channel, the side information transmission method may further include: determining the scrambling mode of the data signal; and determining the cyclic shift information indicating the scrambling mode of the data signal in accordance with a predetermined mapping relationship between the scrambling modes and the cyclic shift information.

In the embodiments of the present disclosure, the cyclic shift information of the data signal may be determined in accordance with the mapping relationship, so it is able to reliably notify the receiver of the scrambling mode of the data signal.

In a possible embodiment of the present disclosure, prior to determining the cyclic shift information indicating the scrambling mode of the data signal in accordance with the predetermined mapping relationship between the scrambling modes and the cyclic shift information, the side information transmission method may further include acquiring high-layer signaling including at least one cyclic shift information. The step of determining the cyclic shift information indicating the scrambling mode of the data signal in accordance with the predetermined mapping relationship between the scrambling modes and the cyclic shift information may include: selecting cyclic shift information indicating the scrambling mode of the data signal from the at least one cyclic shift information in accordance with the predetermined mapping relationship between the scrambling modes and the cyclic shift information.

In the embodiments of the present disclosure, the step of acquiring the high-layer signaling may include acquiring the high-layer signaling from the receiver or the other network side device, e.g., the other base station or core network device, which will not be particularly defined herein. The cyclic shift information is configured by the receiver through the high-layer signaling, so it is able indicate the scrambling mode of the data signal through the at least one cyclic shift information in an entire cell or a certain coverage range. In this regard, it is able for the receiver to identify the data signal more easily without any additional identification policy, thereby to reduce the complexity of the transmission system.

In a possible embodiment of the present disclosure, the side information transmission method may further include Step 303 of reporting capability information to the receiver. The capability information may be at least used to indicate whether the transmitter supports a target mode for reducing the PAPR, and the target mode may be a mode in which the PAPR is reduced through the transmission of the side information on the physical control channel.

In the embodiments of the present disclosure, the capability information may be reported to the receiver, so as to indicate whether the transmitter supports the target mode for reducing the PAPR, i.e., whether the transmitter supports the mode for reducing the PAPR mentioned in the embodiments of the present disclosure. In this regard, the data signal may be transmitted between the transmitter and the receiver using the method in the embodiments of the present disclosure only when the transmitter supports the target mode, so as to prevent the waste of transmission resources for the data signal when the transmitter does not support the target mode.

In addition, the capability information may be pre-stored in the transmitter, or acquired by temporarily identifying the capability of the transmitter during a reporting process of the transmitter. The capability information may be UE waveform capability information.

In addition, in the embodiments of the present disclosure, an order of Step 303 and Steps 301-302 will not be particularly defined. For example, as shown in FIG. 3, Step 303 may be performed subsequent to Steps 301-302. It should be appreciated that, Step 303 may also be performed prior to Steps 301-302, or Step 303 and Steps 301-302 may be performed simultaneously, which will not be particularly defined herein.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink cyclic prefix orthogonal frequency-division multiplexing (CP-OFDM) waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In the embodiments of the present disclosure, the capability information may include the UE capability information and the first bit information, and the first bit information may include 1 bit. For example, "1" may be used to indicate that the transmitter supports the target mode for reducing the PAPR, and "0" may be used to indicate that the transmitter does not support the target mode for reducing the PAPR. It should be appreciated that, the 1 bit is merely for illustrative purposes, and the first bit information may include more than one bit. In this regard, based on the UE capability information and the first bit information, the transmitter may transmit the UE capability and report whether the transmitter supports the target mode for reducing the PAPR through merely one signaling, so it is able to save the transmission resources.

In addition, when the transmitter reports that it supports the uplink CP-OFDM, the transmitter may support the target mode for reducing the PAPR by default. In this regard, it is unnecessary to provide an additional bit to indicate that the transmitter supports the target mode for reducing the PAPR, so it is able to reduce the signaling overhead.

In the embodiments of the present disclosure, the capability information may also include the indication information indicating whether the transmitter supports the uplink CP-OFDM and the second bit information. In this regard, whether the transmitter supports the uplink CP-OFDM and whether the transmitter supports the target mode for reducing the PAPR may be reported through merely one signaling, so it is able to save the transmission resources. The second bit information may include one or more bits, which will not be particularly defined herein.

It should be appreciated that, in the embodiments of the present disclosure, the transmitter may report whether the transmitter supports the target mode for reducing the PAPR when reporting a Discrete Fourier Transform Spreading Orthogonal Frequency-Division Multiplexing (DFT-S-OFDM) capability, i.e., the two may be reported through merely one report signaling.

In a possible embodiment of the present disclosure, the physical control channel may include a Physical Uplink Control Channel (PUCCH) or a New Radio Physical Uplink Control Channel (NR-PUCCH), and/or the physical data channel may include a Physical Uplink Shared Channel (PUSCH) or a New Radio Physical Uplink Shared Channel (NR-PUSCH).

It should be appreciated that, in the embodiments of the present disclosure, the physical control channel may not be limited to the PUCCH or NR-PUCCH, and the physical data channel may not be limited to the PUSCH or NR-PUSCH, and any other physical control channels or any other physical data channels may also be applied, which will not be particularly defined herein.

According to the side information transmission method in the embodiments of the present disclosure, the transmitter may transmit the side information to the receiver on the physical control channel, transmit the scrambled data signal to the receiver on the physical data channel, and report the capability information to the receiver. The side information may be used to indicate the scrambling mode of the data signal. The capability information may be at least used to indicate whether the transmitter supports the target mode for reducing the PAPR, and the target mode may be a mode in which the side information is transmitted on the physical control channel to reduce the PAPR. As a result, it is able for the transmitter to reliably notify the receiver of the scrambling mode of the data signal. In addition, it is able for the receiver to descramble the data signal in accordance with the scrambling mode indicated by the side information, thereby to reduce the PAPR for the data transmission system. Further, through reporting the capability information, it is able to prevent the waste of transmission resources for the data signal when the transmitter does not support the target mode, so as to save the transmission resources.

Figure 7:
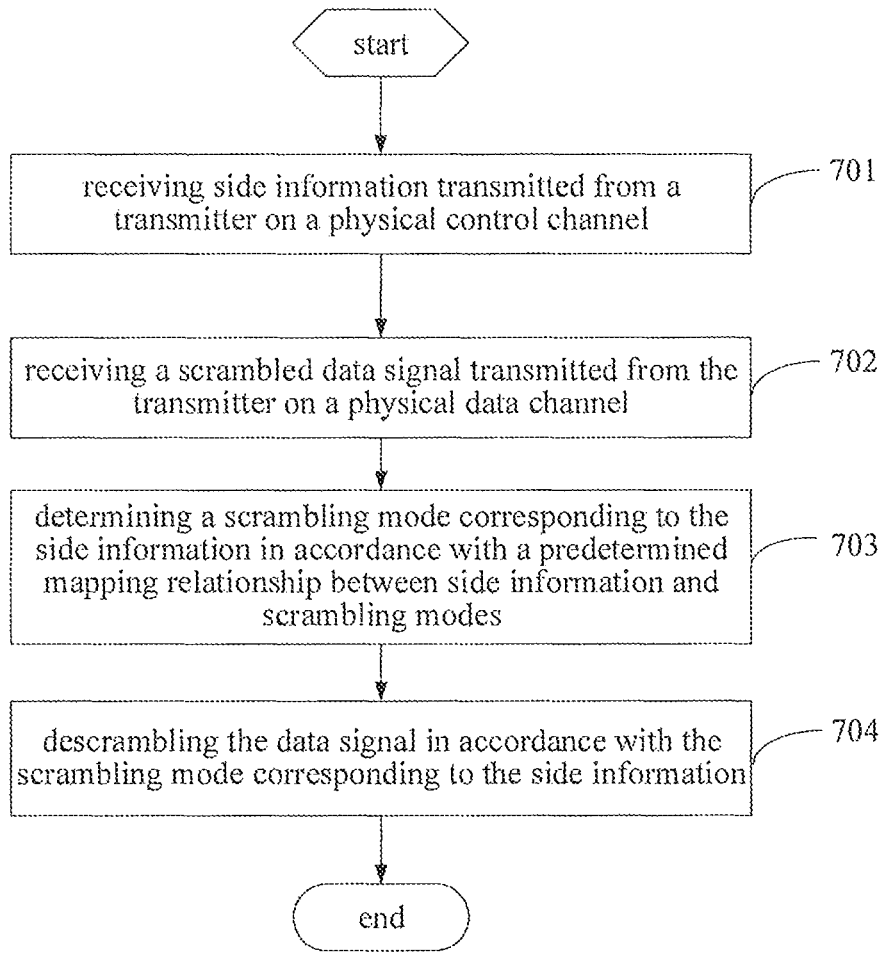
FIG. 7 is a flow chart of a side information reception method according to some embodiments of the present disclosure.

The present disclosure further provides in some embodiments a side information reception method for use in a receiver. As shown in FIG. 7, the side information reception method includes the following steps.

Step 701: receiving side information transmitted from a transmitter on a physical control channel.

The description on the physical control channel and the side information may refer to that mentioned in the embodiment of FIG. 2 and the embodiment of FIGS. 3-6b with a same beneficial effect, and thus will not be particularly defined herein.

Step 702: receiving a scrambled data signal transmitted from the transmitter on a physical data channel.

The description on the physical data channel and the data signal may refer to that mentioned in the embodiment of FIG. 2 and the embodiment of FIGS. 3-6b with a same beneficial effect, and thus will not be particularly defined herein.

Step 703: determining a scrambling mode corresponding to the side information in accordance with a predetermined mapping relationship between side information and scrambling modes.

The mapping relationship between the side information and the scrambling modes may be predetermined at the receiver, or pre-agreed by the receiver with the transmitter, or predefined in a protocol. Upon the receipt of the side information, the receiver may determine the scrambling mode corresponding to the side information, i.e., the scrambling mode of the scrambled data signal.

Step 704: descrambling the data signal in accordance with the scrambling mode corresponding to the side information.

After the scrambling mode corresponding to the side information, i.e., the scrambling mode of the scrambled data signal, has been determined, the receiver may descramble the data signal in accordance with the scrambling mode, so as to acquire initial data. Here, the initial data may be data before the transmitter has scrambled the data signal.

Through the above steps, it is able to determine the scrambling mode of the data signal in accordance with the side information, so as to descramble the data signal, thereby to reduce a PAPR for a data transmission system.

In a possible embodiment of the present disclosure, the side information may be used to indicate the scrambling mode of each of K scrambled data signal blocks and indicate that no phase rotation is performed on the side information. The step of receiving the scrambled data signal transmitted from the transmitter on the physical data channel may include receiving the K scrambled data signal blocks transmitted by the transmitter in a frequency-division multiplexing manner on the physical data signal, where K is a positive integer. The step of determining the scrambling mode corresponding to the side information in accordance with the predetermined mapping relationship between the side information and the scrambling modes may include: determining K scrambling modes corresponding to the side information in accordance with the predetermined mapping relationship between the side information and the scrambling modes. The step of descrambling the data signal in accordance with the scrambling mode corresponding to the side information may include: descrambling the K scrambled data signal blocks in accordance with the K scrambling modes respectively.

In the embodiments of the present disclosure, the scrambling modes of data signals of the K scrambled data signal blocks may be determined in accordance with the side information, so it is able to accurately descramble the data signal. The description on the K scrambled data signal blocks and the K scrambling modes may refer to that mentioned in the embodiment of FIG. 2 and the embodiment of FIGS. 3-6*b* with a same beneficial effect, and thus will not be particularly defined herein.

In a possible embodiment of the present disclosure, the step of receiving the side information transmitted from the transmitter on the physical control channel may include: receiving control information transmitted from the transmitter on the physical control channel. The control information may at least include the side information.

The description on the control information may refer to that mentioned in the embodiment of FIG. 2 and the embodiment of FIGS. 3-6*b* with a same beneficial effect, and thus will not be particularly defined herein.

In a possible embodiment of the present disclosure, the control information may be UCI on which no phase rotation is performed.

The description on the UCI may refer to that mentioned in the embodiment of FIG. 2 and the embodiment of FIGS. 3-6*b* with a same beneficial effect, and thus will not be particularly defined herein.

In a possible embodiment of the present disclosure, the step of receiving the control information transmitted from the transmitter on the physical control channel may include: receiving the control information transmitted from the transmitter through the physical control channel on frequency-domain resources at two sides of a frequency-domain resource occupied by the physical data channel, or a frequency-domain resource at one side of the frequency-domain resource occupied by the physical data channel.

The description on the frequency-domain resources may refer to that mentioned in the embodiment of FIG. 2 and the embodiment of FIGS. 3-6*b* with a same beneficial effect, and thus will not be particularly defined herein.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data channel may be the same as a time-domain resource occupied by the physical control channel.

The description on the frequency-domain resources and the time-domain resources may refer to that mentioned in the embodiment of FIG. 2 and the embodiment of FIGS. 3-6*b* with a same beneficial effect, and thus will not be particularly defined herein.

In a possible embodiment of the present disclosure, the side information may include phase rotation indication information of the data signal, and the phase rotation indication information may be used to indicate the scrambling mode of the data signal.

The description on the phase rotation indication information may refer to that mentioned in the embodiment of FIG. 2 and the embodiment of FIGS. 3-6*b* with a same beneficial effect, and thus will not be particularly defined herein.

In a possible embodiment of the present disclosure, the step of receiving the side information transmitted from the transmitter on the physical control channel may include: receiving a reference signal transmitted from the transmitter on the physical control channel, and the reference signal may at least include the side information.

The description on the reference signal may refer to that mentioned in the embodiment of FIG. 2 and the embodiment of FIGS. 3-6*b* with a same beneficial effect, and thus will not be particularly defined herein.

In a possible embodiment of the present disclosure, the reference signal may be a DMRS.

The description on the DMRS may refer to that mentioned in the embodiment of FIG. 2 and the embodiment of FIGS. 3-6*b* with a same beneficial effect, and thus will not be particularly defined herein.

In a possible embodiment of the present disclosure, the side information may include cyclic shift information, and the cyclic shift information may be used to indicate the scrambling mode of the data signal.

The description on the cyclic shift information may refer to that mentioned in the embodiment of FIG. 2 and the embodiment of FIGS. 3-6*b* with a same beneficial effect, and thus will not be particularly defined herein.

In a possible embodiment of the present disclosure, prior to receiving the reference signal transmitted from the transmitter on the physical control channel, the side information reception method may further include transmitting high-layer signaling to the transmitter. The high-layer signaling may include at least one cyclic shift information, and the at least one cyclic shift information may include the cyclic shift information transmitted from the transmitter.

The description on the high-layer signaling may refer to that mentioned in the embodiment of FIG. 2 and the embodiment of FIGS. 3-6*b* with a same beneficial effect, and thus will not be particularly defined herein.

The step of receiving the reference signal transmitted from the transmitter on the physical control channel may include: performing blind detection on the reference signal transmitted from the transmitter on the physical control channel in accordance with cyclic shift information in a cyclic shift information set including the at least one cyclic shift information until the reference signal is received accurately, and determining the one cyclic shift information adopted for the blind detection when the reference signal is received accurately as the cyclic shift information carried in the reference signal.

In the embodiments of the present disclosure, during the reception of the reference signal by the receiver, the cyclic shift information included in the reference signal is unknown to the receiver. In other words, during the reception of the reference signal including the unknown cyclic shift information by the receiver, the receiver may perform the blind detection on a plurality of possible cyclic shift information in the cyclic shift information set including the at least one cyclic shift information indicated in the high-layer signaling transmitted previously to the transmitter, until the accurate reception information is received. Then, the cyclic shift information for the blind detection adopted when the accurate reception information is received may be determined as the cyclic shift information carried in the reference signal. Through the blind detection, it is unnecessary for the transmitter to notify the receiver of the cyclic shift information included in the reference signal through signaling, so it is able to reduce the signaling interaction between the receiver and the transmitter, thereby to save the transmission resources.

In a possible embodiment of the present disclosure, the side information reception method may further include receiving capability information reported by the transmitter. The capability information may be at least used to indicate whether the transmitter supports a target mode for reducing the PAPR, and the target mode may be a mode in which the side information is transmitted on the physical control channel so as to reduce the PAPR.

The description on the capability information may refer to that mentioned in the embodiment of FIG. 2 and the embodiment of FIGS. 3-6*b* with a same beneficial effect, and thus will not be particularly defined herein.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

The description on the capability information may refer to that mentioned in the embodiment of FIG. 2 and the embodiment of FIGS. 3-6*b* with a same beneficial effect, and thus will not be particularly defined herein.

In a possible embodiment of the present disclosure, the physical control channel may include a PUCCH or an NR-PUCCH, and/or the physical data channel may include a PUSCH or an NR-PUSCH.

According to the side information reception method in the embodiments of the present disclosure, the receiver may receive the side information transmitted from the transmitter on the physical control channel, receive the scrambled data signal transmitted from the transmitter on the physical data channel, determine the scrambling mode corresponding to the side information in accordance with the predetermined mapping relationship between the side information and the scrambling modes, and descramble the data signal in accordance with the scrambling mode corresponding to the side information. As a result, the transmitter may reliably notify the receiver of the scrambling mode of the data signal, so it is able for the receiver to determine the scrambling mode of the data signal in accordance with the side information and descramble the data signal, thereby to reduce the PAPR for the data transmission system.

Figure 8:
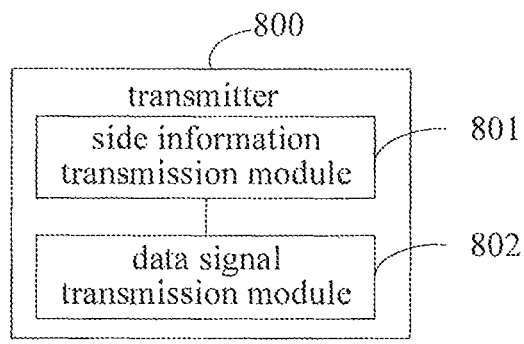
FIG. 8 is a schematic view showing a transmitter according to some embodiments of the present disclosure.

The present disclosure further provides in some embodiments a transmitter capable of implementing the side information transmission method mentioned in the embodiment of FIG. 2 and the embodiment of FIGS. 3-6*b* with a same beneficial effect. As shown in FIG. 8, the transmitter 800 includes a side information transmission module 801 and a data signal transmission module 802 connected to the side information transmission module 801. The side information transmission module 801 is configured to transmit side information to a receiver on a physical control channel. The data signal transmission module 802 is configured to transmit a scrambled data signal to the receiver on a physical data channel. The side information is used to indicate a scrambling mode of the data signal.

Figure 9:
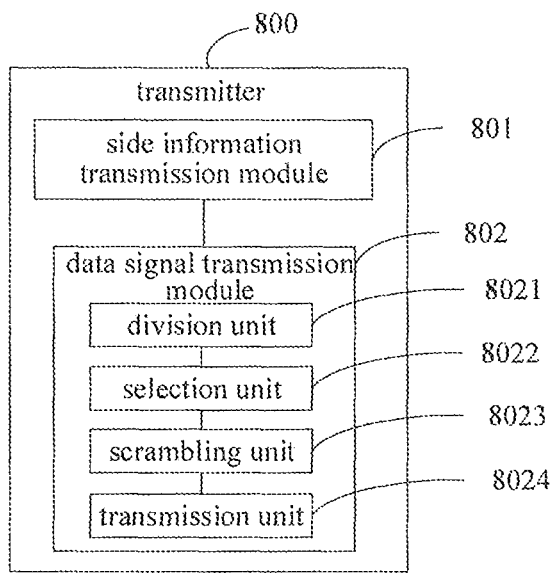
FIG. 9 is another schematic view showing the transmitter according to some embodiments of the present disclosure.

In a possible embodiment of the present disclosure, as shown in FIG. 9, the data signal transmission module 802 may include: a division unit 8021 configured to divide initial data into K data signal blocks, each data signal block corresponding to N different phase rotations, K and N being each a positive integer; a selection unit 8022 configured to select a phase rotation for each data signal block from the N different phase rotations; a scrambling unit 8023 configured to scramble the K data signal blocks in accordance with the phase rotation for each data signal block, to obtain K scrambled data signal blocks; and a transmission unit 8024 configured to transmit the K scrambled data signal blocks in a frequency-division multiplexing manner to the receiver on the physical data channel. The side information may be used to indicate scrambling modes of the K scrambled data signal blocks and indicate that no phase rotation is performed on the side information.

In a possible embodiment of the present disclosure, the side information transmission module 801 is further configured to transmit control information to the receiver on the physical control channel, and the control information may at least include the side information.

In a possible embodiment of the present disclosure, the control information may be UCI on which no phase rotation is performed.

In a possible embodiment of the present disclosure, the side information transmission module 801 is further configured to transmit the control information to the receiver through the physical control channel on frequency-domain resources at two sides of a frequency-domain resource occupied by the physical data channel, or transmit the control information to the receiver through the physical control channel on frequency-domain resources at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

Figure 10:
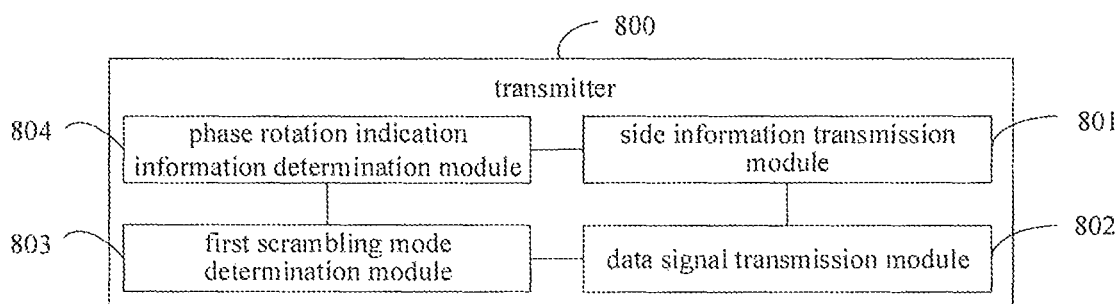
FIG. 10 is yet another schematic view showing the transmitter according to some embodiments of the present disclosure.

In a possible embodiment of the present disclosure, as shown in FIG. 10, the transmitter 800 may further include: a first scrambling mode determination module 803 configured to determine the scrambling mode of the data signal; and a phase rotation indication information determination module 804 configured to determine the phase rotation indication information indicating the scrambling mode of the data signal in accordance with a predetermined mapping relationship between the scrambling modes and the phase rotation indication information.

In a possible embodiment of the present disclosure, the side information transmission module 801 is further configured to transmit a reference signal to the receiver on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

Figure 11:
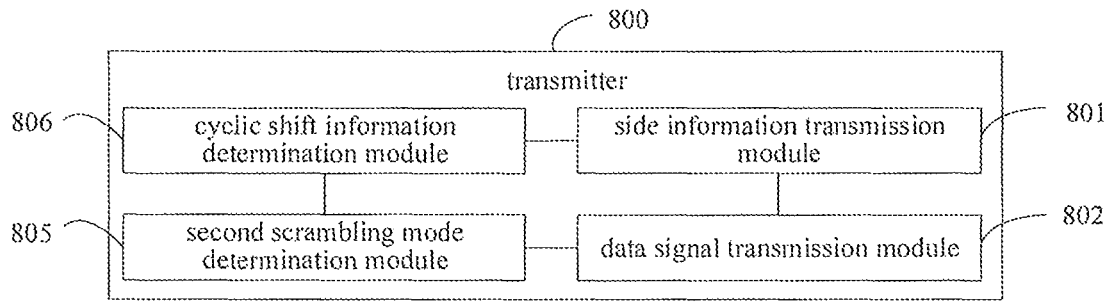
FIG. 11 is still yet another schematic view showing the transmitter according to some embodiments of the present disclosure.

In a possible embodiment of the present disclosure, as shown in FIG. 11, the transmitter 800 may further include: a second scrambling mode determination module 805 configured to determine the scrambling mode of the data signal; and a cyclic shift information determination module 806 configured to determine the cyclic shift information indicating the scrambling mode of the data signal in accordance with the predetermined mapping relationship between the scrambling modes and the cyclic shift information.

Figure 12:
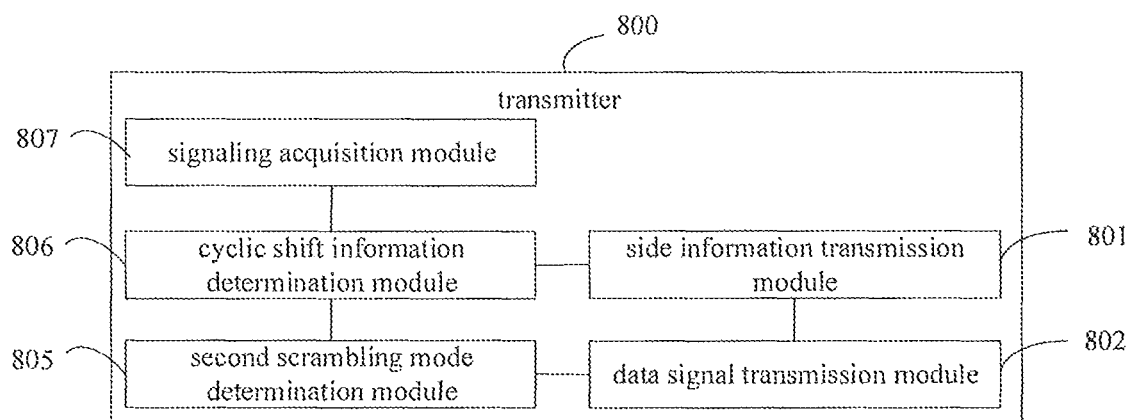
FIG. 12 is still yet another schematic view showing the transmitter according to some embodiments of the present disclosure.

In a possible embodiment of the present disclosure, as shown in FIG. 12, the transmitter 800 may further include a signaling acquisition module 807 configured to acquire high-layer signaling, and the high-layer signaling may include at least one cyclic shift information. The cyclic shift information determination module 806 is further configured to select one cyclic shift information indicating the scrambling mode of the data signal from the at least one cyclic shift information in accordance with the predetermined mapping relationship between the scrambling modes and the cyclic shift information.

Figure 13:
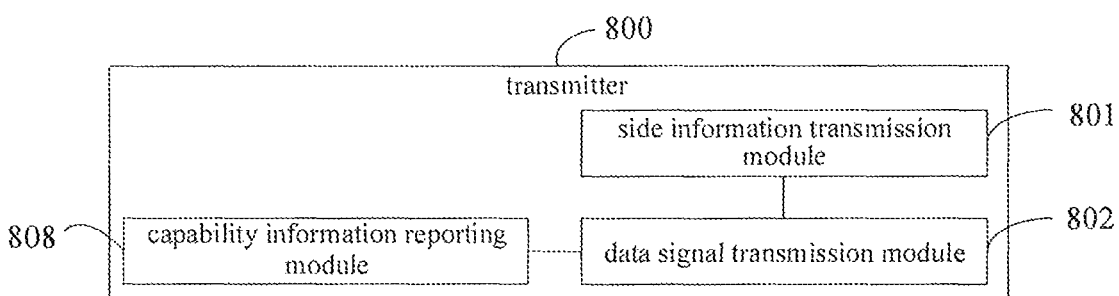
FIG. 13 is still yet another schematic view showing the transmitter according to some embodiments of the present disclosure.

In a possible embodiment of the present disclosure, as shown in FIG. 13, the transmitter 800 may further include a capability information reporting module 808 configured to report capability information to the receiver. The capability information may be at least used to indicate whether the transmitter supports a target mode for reducing a PAPR, and the target mode may be a mode in which the side information is transmitted on the physical control channel to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the transmitter in the embodiments of the present disclosure, the transmitter may transmit the side information to the receiver on the physical control channel, transmit the scrambled data signal to the receiver on the physical data channel, and report the capability information to the receiver. The side information may be used to indicate the scrambling mode of the data signal. As a result, it is able for the transmitter to reliably notify the receiver of the scrambling mode of the data signal. In addition, it is able for the receiver to descramble the data signal in accordance with the scrambling mode indicated by the side information, thereby to reduce the PAPR for the data transmission system.

Figure 14:
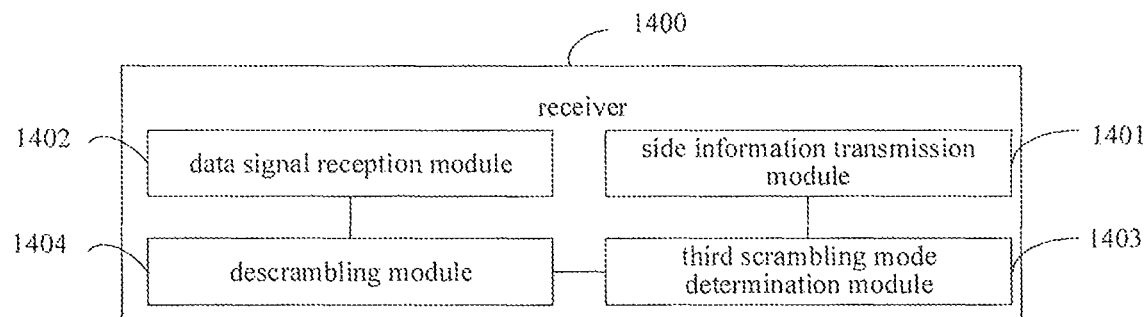
FIG. 14 is a schematic view showing a receiver according to some embodiments of the present disclosure.

Referring to FIG. 14, the present disclosure further provides in some embodiments a receiver capable of implementing the side information reception method in FIG. 7 with a same beneficial effect. As shown in FIG. 14, the receiver 1400 includes a side information reception module 1401, a data signal reception module 1402, a third scrambling mode determination module 1403 and a descrambling module 1404. The side information reception module 1401 is connected to the third scrambling mode determination module 1403, the data signal reception module 1402 is connected to the third scrambling mode determination module 1403 and the descrambling module 1404, and the third scrambling mode determination module 1403 is further connected to the descrambling module 1404.

The side information reception module 1401 is configured to receive side information transmitted from a transmitter on a physical control channel. The data signal reception module 1402 is configured to receive a scrambled data signal transmitted from the transmitter on a physical data channel. The third scrambling mode determination module 1403 is configured to determine a scrambling mode corresponding to the side information in accordance with a predetermined mapping relationship between side information and scrambling modes. The descrambling module 1404 is configured to descramble the data signal in accordance with the scrambling mode corresponding to the side information.

In a possible embodiment of the present disclosure, the side information may be used to indicate the scrambling modes of K scrambled data signal blocks and indicate that no phase rotation is performed on the side information. The data signal reception module 1402 is further configured to receive the K scrambled data signal blocks transmitted by the transmitter in a frequency-division multiplexing manner on the physical data channel, where K is a positive integer. The third scrambling mode determination module 1403 is further configured to determine K scrambling modes corresponding to the side information in accordance with the predetermined mapping relationship between the side information and the scrambling modes. The descrambling module 1404 is further configured to descramble the K scrambled data signal blocks in accordance with the K scrambling modes respectively.

In a possible embodiment of the present disclosure, the side information reception module 1401 is further configured to receive control information transmitted from the transmitter on the physical control channel. The control information may at least include the side information.

In a possible embodiment of the present disclosure, the control information may be UCI on which no phase rotation is performed.

In a possible embodiment of the present disclosure, the side information reception module 1401 is further configured to receive the control information transmitted from the transmitter through the physical control channel on frequency-domain resources at two sides of a frequency-domain resource occupied by the physical data channel, or receive the control information transmitted from the transmitter through the physical control channel on a frequency-domain resource at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

In a possible embodiment of the present disclosure, the side information reception module 1401 is further configured to receive a reference signal transmitted from the transmitter on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

Figure 15:
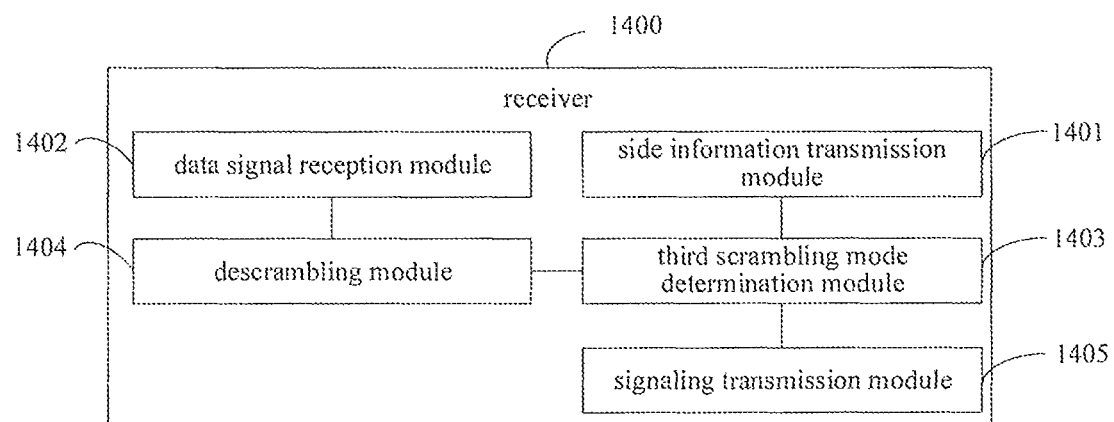
FIG. 15 is another schematic view showing the receiver according to some embodiments of the present disclosure.

In a possible embodiment of the present disclosure, as shown in FIG. 15, the receiver 1400 may further include a signaling transmission module 1405 configured to transmit high-layer signaling to the transmitter. The high-layer signaling may include at least one cyclic shift information, and the at least one cyclic shift information may include the cyclic shift information transmitted from the transmitter.

In a possible embodiment of the present disclosure, the side information reception module 1401 is further configured to perform blind detection on the reference signal transmitted from the transmitter on the physical control channel in accordance with cyclic shift information in a cyclic shift information set including the at least one cyclic shift information until the reference signal is received accurately, and determine the one cyclic shift information adopted for blind detection when the reference signal is received accurately as the cyclic shift information carried in the reference signal.

Figure 16:
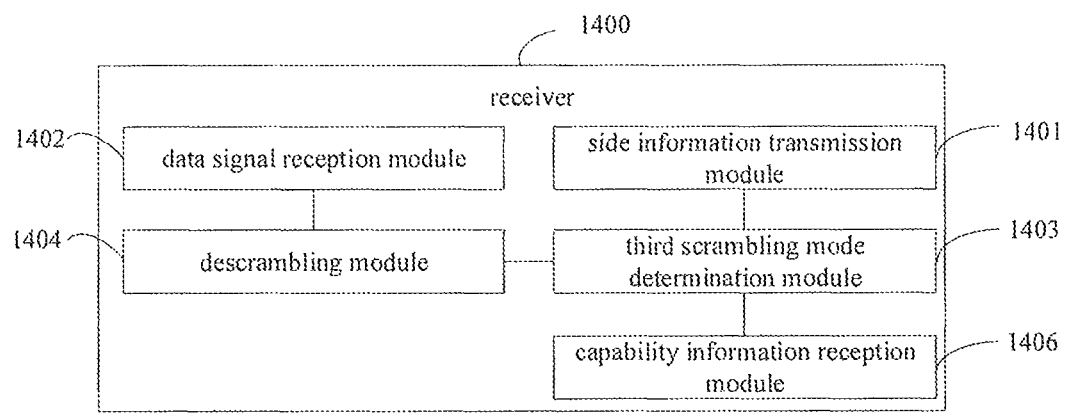
FIG. 16 is yet another schematic view showing the receiver according to some embodiments of the present disclosure.

In a possible embodiment of the present disclosure, as shown in FIG. 16, the receiver 1400 may further include a capability information reception module 1406 configured to receive capability information reported by the transmitter. The capability information may be at least used to indicate whether the transmitter supports a target mode for reducing the PAPR, and the target mode may be a mode in which the side information is transmitted on the physical control channel so as to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the receiver in the embodiments of the present disclosure, the receiver may receive the side information transmitted from the transmitter on the physical control channel, receive the scrambled data signal transmitted from the transmitter on the physical data channel, determine the scrambling mode corresponding to the side information in accordance with the predetermined mapping relationship between the side information and the scrambling modes, and descramble the data signal in accordance with the scrambling mode corresponding to the side information. As a result, the transmitter may reliably notify the receiver of the scrambling mode of the data signal, so it is able for the receiver to determine the scrambling mode of the data signal in accordance with the side information and descramble the data signal, thereby to reduce the PAPR for the data transmission system.

Figure 17:
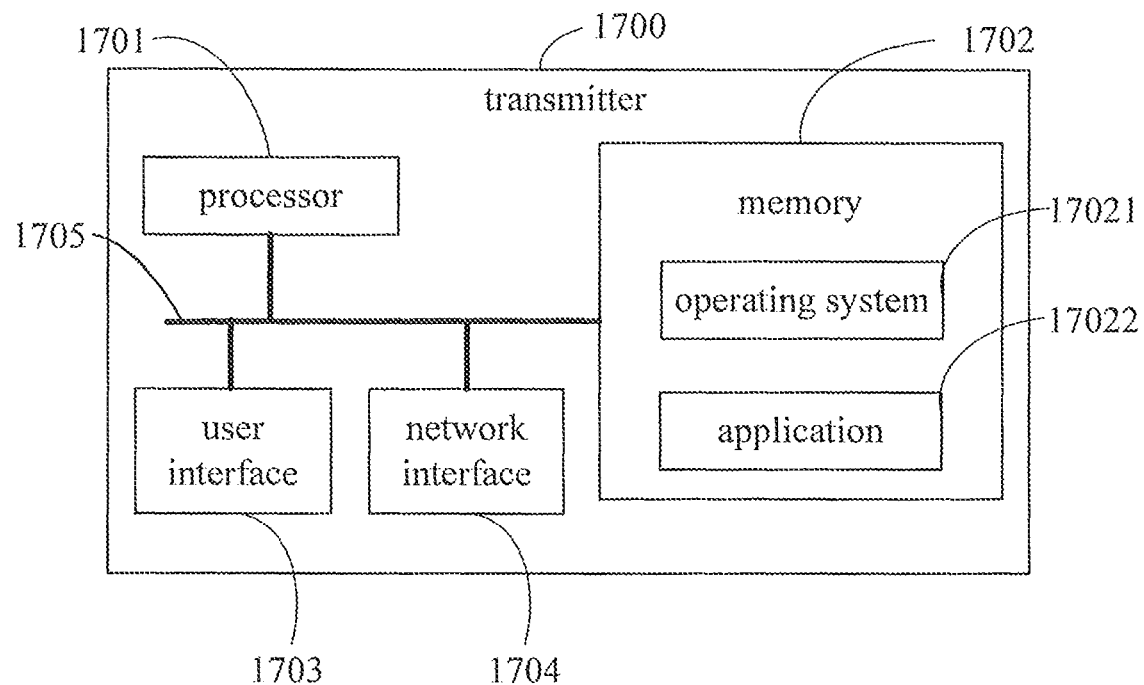
FIG. 17 is still yet another schematic view showing the transmitter according to some embodiments of the present disclosure.

Referring to FIG. 17, the present disclosure further provides in some embodiments a transmitter capable of implementing the side information transmission method mentioned in the embodiment of FIG. 2 and the embodiment of FIGS. 3-6b with a same beneficial effect. As shown in FIG. 17, the transmitter 1700 includes at least one processor 1701, a memory 1702, at least one network interface 1704 and a user interface 1703. The components of the transmitter 1700 may be coupled together through a bus system 1705. It should be appreciated that, the bus system 1705 is configured to achieve connection and communication among the components. Apart from a data bus, the bus system 1705 may further include a power source bus, a control bus and a state signal bus. For clarification, all these buses in FIG. 17 may be collectedly called as bus system 1705.

The user interface 1703 may include a display, a keyboard or a pointing device (e.g., a mouse, a track ball, a touch plate or a touch panel).

It should be appreciated that, the memory 1702 may be a volatile memory, a nonvolatile memory or both. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) which serves as an external high-speed cache. Illustratively but non-restrictively, the RAM may include a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchronous Link DRAM (SLDRAM) or a Direct Rambus RAM (DRRAM). The memory 1702 intends to include, but not limited to, the above-mentioned and any other appropriate memories.

In a possible embodiment of the present disclosure, the following elements may be stored in the memory 1702: an executable module or data structure, a subset or an extended set thereof, an operating system 17021 and an application 17022.

The operating system 17021 may include various system programs, e.g., a framework layer, a core layer and a driving layer, so as to implement various basic services and process hardware-based tasks. The application 17022 may include various applications, e.g., Media Player and Browser, so as to implement various application services. The programs for implementing the above-mentioned method may be included in the application 17022.

In the embodiments of the present disclosure, through calling a program or instruction stored in the memory 1702, e.g., a program or instruction stored in the application 17022, the processor 1701 is configured to: transmit side information to a receiver on a physical control channel; and transmit a scrambled data signal to the receiver on a physical data channel. The side information may be used to indicate a scrambling mode of the data signal.

The above-mentioned method may be applied to, or implemented by, the processor 1701. The processor 1701 may be an integrated circuit (IC) having a signal processing capability. During the implementation, the steps of the above-mentioned method may be completed through an integrated logic circuit of hardware in the processor 1701 or instructions in the form of software. The processor 1701 may be a general-purpose processor, a digital signal processor, an Application-Specific Integrated Circuit (ASIC), a Field Programmable Gate Array (FPGA) or another programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the decoding processor in the form of hardware, or a combination of hardware and software modules in the decoding processor. The software module may be located in a known storage medium such as an RAM, a flash memory, an ROM, a PROM, an EEPROM, or a register. The storage medium may be located in the memory 1702, and the processor 1701 may read information stored in the memory 1702 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a Digital Signal Processor (DSP), a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the processor 1701 is further configured to: divide initial data into K data signal blocks, each data signal block corresponding to N different phase rotations, K and N being each a positive integer; select a phase rotation for each data signal block from the N different phase rotations; scramble the K data signal blocks in accordance with the phase rotation for each data signal block to obtain K scrambled data signal blocks; and transmit the K scrambled data signal blocks in a frequency-division multiplexing manner to the receiver on the physical data channel. The side information may be used to indicate scrambling modes of the K scrambled data signal blocks and indicate that no phase rotation is performed on the side information.

In a possible embodiment of the present disclosure, the processor 1701 is further configured to transmit control information to the receiver on the physical control channel, and the control information may at least include the side information.

In a possible embodiment of the present disclosure, the control information may be UCI on which no phase rotation is performed.

In a possible embodiment of the present disclosure, the processor 1701 is further configured to transmit the control information to the receiver through the physical control channel on frequency-domain resources at two sides of a frequency-domain resource occupied by the physical data channel, or transmit the control information to the receiver through the physical control channel on frequency-domain resources at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

In a possible embodiment of the present disclosure, the processor 1701 is further configured to determine the scrambling mode of the data signal, and determine the phase rotation indication information indicating the scrambling mode of the data signal in accordance with a predetermined mapping relationship between the scrambling modes and the phase rotation indication information.

In a possible embodiment of the present disclosure, the processor 1701 is further configured to transmit a reference signal to the receiver on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

In a possible embodiment of the present disclosure, the processor 1701 is further configured to: determine the scrambling mode of the data signal; and determine the cyclic shift information indicating the scrambling mode of the data signal in accordance with the predetermined mapping relationship between the scrambling modes and the cyclic shift information.

In a possible embodiment of the present disclosure, the processor 1701 is further configured to: acquire high-layer signaling, the high-layer signaling including at least one cyclic shift information; and select cyclic shift information indicating the scrambling mode of the data signal from the at least one cyclic shift information in accordance with the predetermined mapping relationship between the scrambling modes and the cyclic shift information.

In a possible embodiment of the present disclosure, the processor 1701 is further configured to report capability information to the receiver. The capability information may be at least used to indicate whether the transmitter supports a target mode for reducing a PAPR, and the target mode may be a mode in which the side information is transmitted on the physical control channel to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the transmitter in the embodiments of the present disclosure, the transmitter may transmit the side information to the receiver on the physical control channel, transmit the scrambled data signal to the receiver on the physical data channel, and report the capability information to the receiver. The side information may be used to indicate the scrambling mode of the data signal. As a result, it is able for the transmitter to reliably notify the receiver of the scrambling mode of the data signal. In addition, it is able for the receiver to descramble the data signal in accordance with the scrambling mode indicated by the side information, thereby to reduce the PAPR for the data transmission system.

Figure 18:
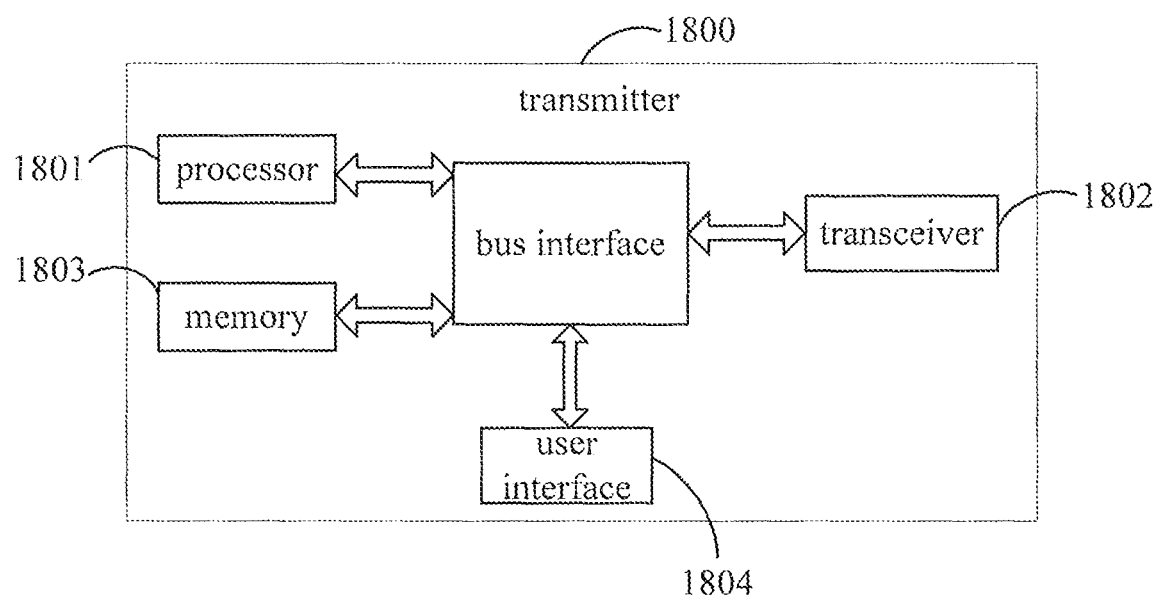
FIG. 18 is still yet another schematic view showing the transmitter according to some embodiments of the present disclosure.

Referring to FIG. 18, the present disclosure further provides in some embodiments a transmitter capable of implementing the side information transmission method mentioned in the embodiment of FIG. 2 and the embodiment of FIGS. 3-6b with a same beneficial effect. As shown in FIG. 18, the transmitter 1800 includes a processor 1801, a transceiver 1802, a memory 1803, a user interface 1804 and a bus interface. The processor 1801 is configured to read a program stored in the memory 1803, so as to: transmit side information to a receiver on a physical control channel; and transmit a scrambled data signal to the receiver on a physical data channel. The side information may be used to indicate a scrambling mode of the data signal. The transceiver 1802 is configured to receive and transmit data under the control of the processor 1801.

In FIG. 18, bus architecture may include a number of buses and bridges connected to each other, so as to connect various circuits for one or more processors such as the processor 1801 and one or more memories such as the memory 1803. In addition, the bus architecture may be used to connect any other circuits, such as a circuit for a peripheral device, a circuit for a voltage stabilizer and a power management circuit. The bus interface may be provided, and the transceiver 1802 may consist of a plurality of elements, i.e., a transmitter and a receiver for communication with any other devices over a transmission medium. With respect to different UEs, the user interface 1804 may also be provided for devices which are to be arranged inside or outside the UE, and these devices may include but not limited to a keypad, a display, a speaker, a microphone and a joystick. The processor 1801 may take charge of managing the bus architecture as well general processings, e.g., running a general-purpose operating system. The memory 1803 may store data therein for the operation of the processor 1801.

In a possible embodiment of the present disclosure, the processor 1801 is further configured to: divide initial data into K data signal blocks, each data signal block corresponding to N different phase rotations, K and N being each a positive integer; select a phase rotation for each data signal block from the N different phase rotations; scramble the K data signal blocks in accordance with the phase rotation for each data signal block to obtain K scrambled data signal blocks; and transmit the K scrambled data signal blocks in a frequency-division multiplexing manner to the receiver on the physical data channel. The side information may be used to indicate scrambling modes of the K scrambled data signal blocks and indicate that no phase rotation is performed on the side information.

In a possible embodiment of the present disclosure, the processor 1801 is further configured to transmit control information to the receiver on the physical control channel, and the control information may at least include the side information.

In a possible embodiment of the present disclosure, the control information may be UCI on which no phase rotation is performed.

In a possible embodiment of the present disclosure, the processor 1801 is further configured to transmit the control information to the receiver through the physical control channel on frequency-domain resources at two sides of a frequency-domain resource occupied by the physical data channel, or transmit the control information to the receiver through the physical control channel on frequency-domain resources at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

In a possible embodiment of the present disclosure, the processor 1801 is further configured to determine the scrambling mode of the data signal, and determine the phase rotation indication information indicating the scrambling mode of the data signal in accordance with a predetermined mapping relationship between the scrambling modes and the phase rotation indication information.

In a possible embodiment of the present disclosure, the processor 1801 is further configured to transmit a reference signal to the receiver on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

In a possible embodiment of the present disclosure, the processor 1801 is further configured to: determine the scrambling mode of the data signal; and determine the cyclic shift information indicating the scrambling mode of the data signal in accordance with the predetermined mapping relationship between the scrambling modes and the cyclic shift information.

In a possible embodiment of the present disclosure, the processor 1801 is further configured to: acquire high-layer signaling, the high-layer signaling including at least one cyclic shift information; and select one cyclic shift information indicating the scrambling mode of the data signal from the at least one cyclic shift information in accordance with the predetermined mapping relationship between the scrambling modes and the cyclic shift information.

In a possible embodiment of the present disclosure, the processor 1801 is further configured to report capability information to the receiver. The capability information may be at least used to indicate whether the transmitter supports a target mode for reducing a PAPR, and the target mode may be a mode in which the side information is transmitted on the physical control channel to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the transmitter in the embodiments of the present disclosure, the transmitter may transmit the side information to the receiver on the physical control channel, transmit the scrambled data signal to the receiver on the physical data channel, and report the capability information to the receiver. The side information may be used to indicate the scrambling mode of the data signal. As a result, it is able for the transmitter to reliably notify the receiver of the scrambling mode of the data signal. In addition, it is able for the receiver to descramble the data signal in accordance with the scrambling mode indicated by the side information, thereby to reduce the PAPR for the data transmission system.

Figure 19:
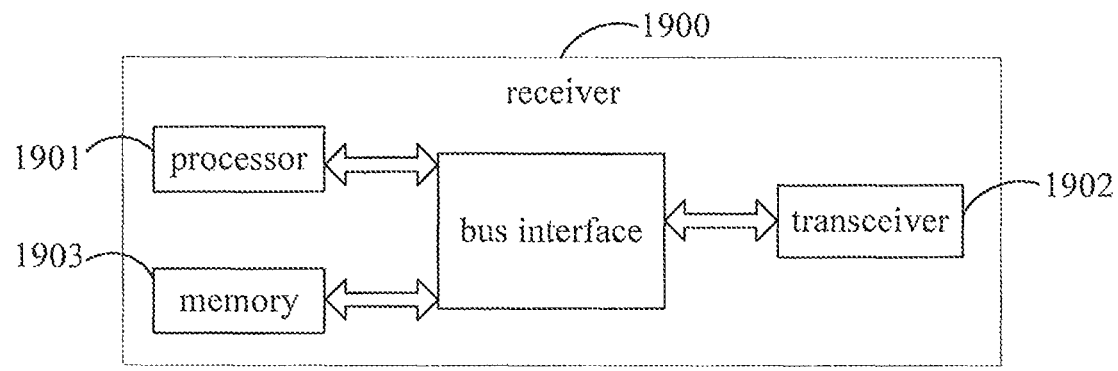
FIG. 19 is still yet another schematic view showing the receiver according to some embodiments of the present disclosure.

Referring to FIG. 19, the present disclosure further provides in some embodiments another receiver capable of implementing the side information reception method mentioned in embodiments of FIG. 7 with a same beneficial effect. As shown in FIG. 19, the receiver 1900 includes a processor 1901, a transceiver 1902, a memory 1903 and a bus interface. The processor 1901 is configured to read a program stored in the memory 1903, so as to: receive side information transmitted from a transmitter on a physical control channel; receive a scrambled data signal transmitted from the transmitter on a physical data channel; determine a scrambling mode corresponding to the side information in accordance with a predetermined mapping relationship between side information and scrambling modes; and descramble the data signal in accordance with the scrambling mode corresponding to the side information. The transceiver 1902 is configured to receive and transmit data under the control of the processor 1901.

In FIG. 19, bus architecture may include a number of buses and bridges connected to each other, so as to connect various circuits for one or more processors such as the processor 1901 and one or more memories such as the memory 1903. In addition, the bus architecture may be used to connect various other circuits, such as a circuit for a peripheral device, a circuit for a voltage stabilizer and a power management circuit. The bus interface may be provided, and the transceiver 1902 may consist of a plurality of elements, i.e., a transmitter and a receiver for communication with any other devices over a transmission medium. The processor 1901 may take charge of managing the bus architecture as well as general processings. The memory 1903 may store therein data for the operation of the processor 1901.

In a possible embodiment of the present disclosure, the side information may be used to indicate the scrambling modes of K scrambled data signal blocks and indicate that no phase rotation is performed on the side information. The processor 1901 is further configured to: receive the K scrambled data signal blocks transmitted by the transmitter in a frequency-division multiplexing manner on the physical data signal, K being a positive integer; determine K scrambling modes corresponding to the side information in accordance with the predetermined mapping relationship between the side information and the scrambling modes; and descramble the K scrambled data signal blocks in accordance with the K scrambling modes respectively.

In a possible embodiment of the present disclosure, the processor 1901 is further configured to receive control information transmitted from the transmitter on the physical control channel. The control information may at least include the side information.

In a possible embodiment of the present disclosure, the control information may be UCI on which no phase rotation is performed.

In a possible embodiment of the present disclosure, the processor 1901 is further configured to receive the control information transmitted from the transmitter through the physical control channel on frequency-domain resources at two sides of a frequency-domain resource occupied by the physical data channel, or receive the control information transmitted from the transmitter through the physical control channel on a frequency-domain resource at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

In a possible embodiment of the present disclosure, the processor 1901 is further configured to receive a reference signal transmitted from the transmitter on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

In a possible embodiment of the present disclosure, the processor 1901 is further configured to transmit high-layer signaling to the transmitter. The high-layer signaling may include at least one cyclic shift information, and the at least one cyclic shift information may include the cyclic shift information transmitted from the transmitter.

In a possible embodiment of the present disclosure, the processor 1901 is further configured to perform blind detection on the reference signal transmitted from the transmitter on the physical control channel in accordance with cyclic shift information in a cyclic shift information set including the at least one cyclic shift information until the reference signal is received accurately, and determine the cyclic shift information adopted for the blind detection when the reference signal is received accurately as the cyclic shift information carried in the reference signal.

In a possible embodiment of the present disclosure, the processor 1901 is further configured to receive capability information reported by the transmitter. The capability information may be at least used to indicate whether the transmitter supports a target mode for reducing the PAPR, and the target mode may be a mode in which the side information is transmitted on the physical control channel so as to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the receiver in the embodiments of the present disclosure, the receiver may receive the side information transmitted from the transmitter on the physical control channel, receive the scrambled data signal transmitted from the transmitter on the physical data channel, determine the scrambling mode corresponding to the side information in accordance with the predetermined mapping relationship between the side information and the scrambling modes, and descramble the data signal in accordance with the scrambling mode corresponding to the side information. As a result, the transmitter may reliably notify the receiver of the scrambling mode of the data signal, and the receiver may determine the scrambling mode of the data signal in accordance with the side information and descramble the data signal, thereby to reduce the PAPR for the data transmission system.

Figure 20:
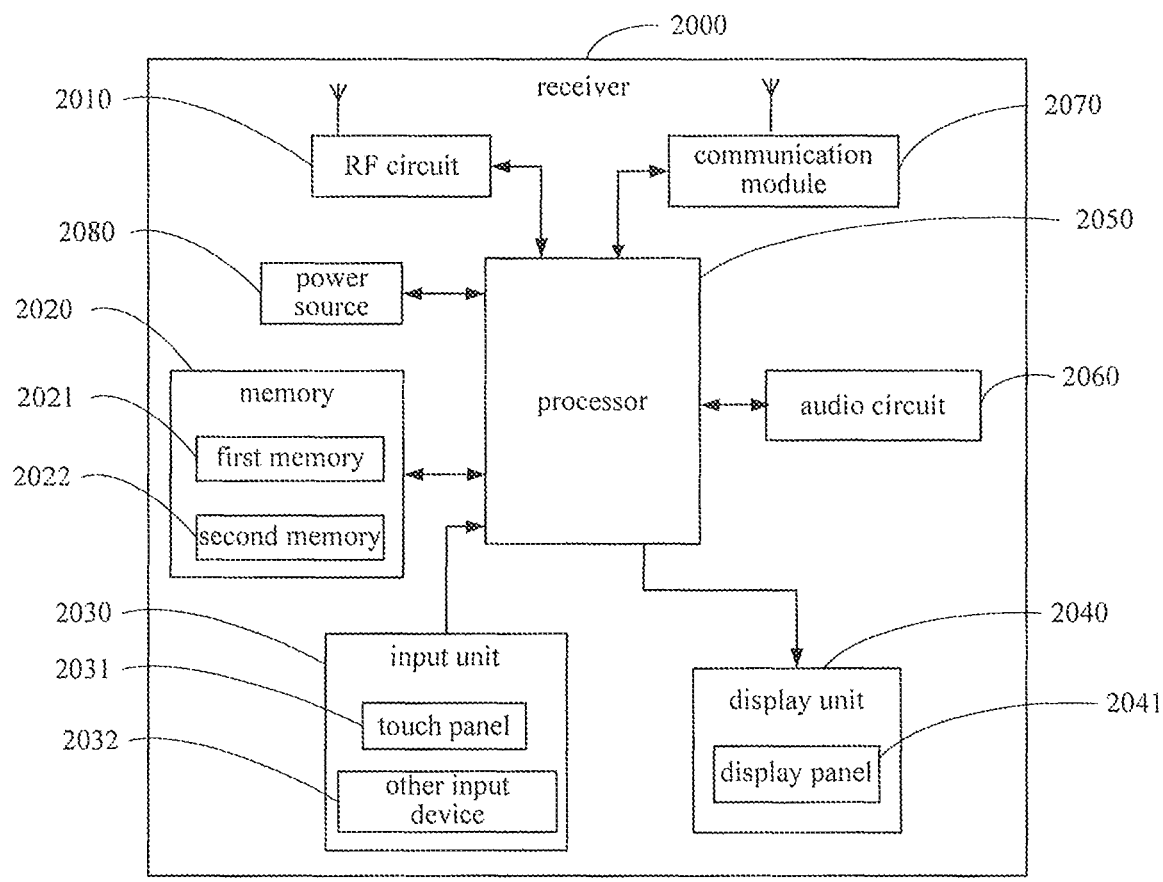
FIG. 20 is still yet another schematic view showing the receiver according to some embodiments of the present disclosure.

Referring to FIG. 20, the present disclosure further provides in some embodiments a receiver capable of implementing details of the identifier definition method of the receiver mentioned in embodiments of FIG. 7 with a same beneficial effect. As shown in FIG. 20, the receiver 2000 includes a Radio Frequency (RF) circuit 2010, a memory 2020, an input unit 2030, a display unit 2040, a processor 2050, an audio circuit 2060, a communication module 2070, and a power source 2080.

The input unit 2030 is configured to receive digital or character information inputted by a user, and generate a signal input related to user settings and function control of the receiver 2000. To be specific, the input unit 2030 may include a touch panel 2031. The touch panel 2031, also called as touch screen, is configured to collect a touch operation made by the user on or in proximity to the touch panel (e.g., an operation made by the user through any appropriate object or attachment (e.g., finger or stylus) on or in the proximity to the touch panel 2031), and driving a corresponding connection device based on a predetermined program. The touch panel 2031 may include a touch detection unit and a touch controller. The touch detection unit is configured to detect a touch position of the user and a signal generated due to the touch operation, and transmit the signal to the touch controller. The touch controller is configured to receive touch information transmitted from the touch detection unit, convert it into coordinates of a touch point, transmit the coordinates to the processor 2050, and receive and execute a command from the processor 2050. In addition, the touch panel 2031 may be of a resistive type, a capacitive type, an infrared type or a surface acoustic wave (SAW) type. Apart from the touch panel 2031, the input unit 2030 may further include an input device 2032 which may include, but not limited to, one or more of a physical keyboard, a functional button (e.g., a volume control button or an on/off button), a trackball, a mouse, and a joystick.

The display unit 2040 is configured to display information inputted by the user or information to be presented to the user, and various interfaces for the receiver 2000, and it may include a display panel 2041. In a possible embodiment of the present disclosure, the display panel 2041 may be a Liquid Crystal Display (LCD) panel or an Organic Light-Emitting Diode (OLED) panel.

It should be appreciated that, the touch panel 2031 may cover the display panel 2031, so as to form a touch display panel. When the touch operation made on or in proximity to the touch display panel has been detected, the touch information may be transmitted to the processor 2050 so as to determine a type of a touch event. Then, the processor 2050 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be used to display interfaces for applications, and each interface may include an icon for at least one application and/or an interface element such as Widget desktop control. The application interface display region may also be a blank interface where no content is contained. The commonly-used controls display region may be used to display controls which are used frequently, e.g., setting button, interface number, scroll bar, or such application icons as telephone book icon.

The processor 2050 may be a control center of the receiver 2000, and connected to each member of the entire UE via various interfaces and lines. The processor 2050 is configured to run or execute software programs and/or modules stored in a first memory 2021, and call data stored in a second memory 2022, so as to achieve various functions of the receiver 2000 and process the data, thereby to monitor the receiver 2000. In a possible embodiment of the present disclosure, the processor 2050 may include one or more processing units.

In the embodiments of the present disclosure, through calling a program or instruction stored in the first memory 2021 and/or the data stored in the second memory 2022, the processor 2050 is configured to: receive side information transmitted from a transmitter on a physical control channel; receive a scrambled data signal transmitted from the transmitter on a physical data channel; determine a scrambling mode corresponding to the side information in accordance with a predetermined mapping relationship between side information and scrambling modes; and descramble the data signal in accordance with the scrambling mode corresponding to the side information.

In a possible embodiment of the present disclosure, the side information may be used to indicate the scrambling modes of K scrambled data signal blocks and indicate that no phase rotation is performed on the side information. The processor 2050 is further configured to: receive the K scrambled data signal blocks transmitted by the transmitter in a frequency-division multiplexing manner on the physical data channel, K being a positive integer; determine K scrambling modes corresponding to the side information in accordance with the predetermined mapping relationship between the side information and the scrambling modes; and descramble the K scrambled data signal blocks in accordance with the K scrambling modes respectively.

In a possible embodiment of the present disclosure, the processor 2050 is further configured to receive control information transmitted from the transmitter on the physical control channel. The control information may at least include the side information.

In a possible embodiment of the present disclosure, the control information may be UCI on which no phase rotation is performed.

In a possible embodiment of the present disclosure, the processor 2050 is further configured to receive the control information transmitted from the transmitter through the physical control channel on frequency-domain resources at two sides of a frequency-domain resource occupied by the physical data channel, or receive the control information transmitted from the transmitter through the physical control channel on a frequency-domain resource at one side of the frequency-domain resource occupied by the physical data channel.

In a possible embodiment of the present disclosure, the frequency-domain resource occupied by the physical data channel may be spaced apart from the frequency-domain resource occupied by the physical control channel by an uplink frequency-domain resource, and/or a time-domain resource occupied by the physical data signal may be the same as a time-domain resource occupied by the physical control channel.

In a possible embodiment of the present disclosure, the side information may include phase rotation indication information of the data signal, and the phase rotation indication information may be used to indicate the scrambling mode of the data signal.

In a possible embodiment of the present disclosure, the processor 2050 is further configured to receive a reference signal transmitted from the transmitter on the physical control channel, and the reference signal may at least include the side information.

In a possible embodiment of the present disclosure, the reference signal may be a DMRS.

In a possible embodiment of the present disclosure, the side information may include cyclic shift information, and the cyclic shift information may be used to indicate the scrambling mode of the data signal.

In a possible embodiment of the present disclosure, the processor 2050 is further configured to transmit high-layer signaling to the transmitter. The high-layer signaling may include at least one cyclic shift information, and the at least one cyclic shift information may include the cyclic shift information transmitted from the transmitter.

In a possible embodiment of the present disclosure, the processor 2050 is further configured to perform blind detection on the reference signal transmitted from the transmitter on the physical control channel in accordance with one cyclic shift information in a cyclic shift information set including the at least one cyclic shift information until the reference signal is received accurately, and determine the one cyclic shift information adopted for the blind detection when the reference signal is received accurately as the cyclic shift information carried in the reference signal.

In a possible embodiment of the present disclosure, the processor 2050 is further configured to receive capability information reported by the transmitter. The capability information may be at least used to indicate whether the transmitter supports a target mode for reducing the PAPR, and the target mode may be a mode in which the side information is transmitted on the physical control channel so as to reduce the PAPR.

In a possible embodiment of the present disclosure, the capability information may include UE capability information and first bit information. The first bit information may be used to indicate whether the transmitter supports the target mode for reducing the PAPR. In another possible embodiment of the present disclosure, the capability information may include indication information indicating whether the transmitter supports an uplink CP-OFDM waveform. When the indication information indicates that the transmitter supports the uplink CP-OFDM waveform, the indication information may be further used to indicate that the transmitter supports the target mode for reducing the PAPR. When the indication information indicates that the transmitter does not support the uplink CP-OFDM waveform, the indication information may be further used to indicate that the transmitter does not support the target mode for reducing the PAPR. In yet another possible embodiment of the present disclosure, the capability information may include the indication information indicating whether the transmitter supports the uplink CP-OFDM waveform and second bit information, and the second bit information may be used to indicate whether the transmitter supports the target mode for reducing the PAPR.

In a possible embodiment of the present disclosure, the physical control channel may include a PUCCH or an NR-PUCCH. The physical data channel may include a PUSCH or an NR-PUSCH.

According to the receiver in the embodiments of the present disclosure, the receiver may receive the side information transmitted from the transmitter on the physical control channel, receive the scrambled data signal transmitted from the transmitter on the physical data channel, determine the scrambling mode corresponding to the side information in accordance with the predetermined mapping relationship between the side information and the scrambling modes, and descramble the data signal in accordance with the scrambling mode corresponding to the side information. As a result, the transmitter may reliably notify the receiver of the scrambling mode of the data signal, and the receiver may determine the scrambling mode of the data signal in accordance with the side information and descramble the data signal, thereby to reduce the PAPR for the data transmission system.

A person skilled in the art may understand that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

A person skilled in the art may further understand that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the units are provided merely on the basis of their logic functions, and the present disclosure is not limited thereto. During the actual application, for example, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in another form.

The units described separately may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the prior art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

The above embodiments are for illustrative purposes only, but the present disclosure is not limited thereto. Obviously, a person skilled in the art may make further modifications and substitutions without departing from the technical scope of the present disclosure, and these modifications and improvements shall also fall within the scope of the present disclosure. Therefore, a protection scope of the present disclosure is defined by claims.

What is claimed is:

1. A side information transmission method for use in a transmitter, wherein the side information transmission method comprises:
   transmitting side information to a receiver on a physical control channel; and
   transmitting a scrambled data signal to the receiver on a physical data channel, wherein the side information is used to indicate a scrambling mode of the data signal;
the transmitting the scrambled data signal to the receiver on the physical data channel comprises:
dividing initial data into number K of data signal blocks, wherein each of the data signal blocks corresponds to number N of different phase rotations, and number K and number N are each a positive integer;
selecting a phase rotation for each data signal block from the number N of different phase rotations;
scrambling the number K of data signal blocks in accordance with the phase rotation for each data signal block, to acquire number K of scrambled data signal blocks; and
transmitting the number K of scrambled data signal blocks to the receiver in a frequency-division multiplexing manner on the physical data channel,
wherein the side information is used to indicate respectively scrambling modes of the number K of scrambled data signal blocks and indicate that no phase rotation is performed on the side information.

2. The side information transmission method according to claim 1, wherein the transmitting the side information to the receiver on the physical control channel comprises:
transmitting control information to the receiver on the physical control channel,
wherein the control information at least comprises the side information.

3. The side information transmission method according to claim 2, wherein
the control information is Uplink Control Indication (UCI) on which no phase rotation is performed; or
the transmitting the control information to the receiver on the physical control channel comprises: transmitting the control information to the receiver through the physical control channel on frequency-domain resources at two sides of a frequency-domain resource occupied by the physical data channel; or transmitting the control information to the receiver through the physical control channel on frequency-domain resources at one side of the frequency-domain resource occupied by the physical data channel.

4. The side information transmission method according to claim 3, wherein
the frequency-domain resource occupied by the physical data channel is spaced apart from a frequency-domain resource occupied by the physical control channel by an uplink frequency-domain resource; and/or
a time-domain resource occupied by the physical data signal is the same as a time-domain resource occupied by the physical control channel.

5. The side information transmission method according to claim 2, wherein the side information comprises phase rotation indication information of the data signal, and the phase rotation indication information is used to indicate the scrambling mode of the data signal.

6. The side information transmission method according to claim 5, wherein prior to transmitting the control information to the receiver on the physical control channel, the side information transmission method further comprises:
determining the scrambling mode of the data signal; and
determining the phase rotation indication information indicating the scrambling mode of the data signal in accordance with a predetermined mapping relationship between scrambling modes and phase rotation indication information.

7. The side information transmission method according to claim 1, wherein
the transmitting the side information to the receiver on the physical control channel comprises: transmitting a reference signal to the receiver on the physical control channel, wherein the reference signal at least comprises the side information; or
the physical control channel comprises a Physical Uplink Control Channel (PUCCH) or a New Radio Physical Uplink Control Channel (NR-PUCCH), and/or the physical data channel comprises a Physical Uplink Shared Channel (PUSCH) and a New Radio Physical Uplink Shared Channel (NR-PUSCH).

8. The side information transmission method according to claim 7, wherein the reference signal is a Demodulation Reference Signal (DMRS).

9. The side information transmission method according to claim 7, wherein the side information comprises cyclic shift information, and the cyclic shift information is used to indicate the scrambling mode of the data signal.

10. The side information transmission method according to claim 9, wherein prior to transmitting the reference signal to the receiver on the physical control channel, the side information transmission method further comprises:
determining the scrambling mode of the data signal; and
determining the cyclic shift information indicating the scrambling mode of the data signal in accordance with a predetermined mapping relationship between the scrambling modes and cyclic shift information.

11. The side information transmission method according to claim 10, wherein prior to determining the cyclic shift information indicating the scrambling mode of the data signal in accordance with the predetermined mapping relationship between the scrambling modes and the cyclic shift information, the side information transmission method further comprises:
acquiring a high-layer signaling, wherein the high-layer signaling comprises at least one cyclic shift information,
wherein the determining the cyclic shift information indicating the scrambling mode of the data signal in accordance with the predetermined mapping relationship between the scrambling modes and the cyclic shift information comprises:
selecting the cyclic shift information indicating the scrambling mode of the data signal from the at least one cyclic shift information in accordance with the predetermined mapping relationship between the scrambling modes and the cyclic shift information.

12. The side information transmission method according to claim 1, further comprising:
reporting capability information to the receiver,
wherein the capability information is at least used to indicate whether the transmitter supports a target mode for reducing a Peak to Average Power Ratio (PAPR), and the target mode is a mode in which the side information is transmitted on the physical control channel to reduce the PAPR.

13. The side information transmission method according to claim 12, wherein
the capability information comprises User Equipment (UE) capability information and first bit information, and the first bit information is used to indicate whether the transmitter supports the target mode for reducing the PAPR; or
the capability information comprises indication information indicating whether the transmitter supports an uplink Cyclic Prefix Orthogonal Frequency-Division Multiplexing (CP-OFDM) waveform, wherein when the indication information indicates that the transmitter supports the uplink CP-OFDM waveform, the indication information is further used to indicate that the transmitter supports the target mode for reducing the PAPR, and when the indication information indicates that the transmitter does not support the uplink CP-OFDM waveform, the indication information is further used to indicate that the transmitter does not support the target mode for reducing the PAPR; or the capability information comprises the indication information indicating whether the transmitter supports the uplink CP-OFDM waveform and second bit information, and the second bit information is used to indicate whether the transmitter supports the target mode for reducing the PAPR.

14. A side information reception method for use in a receiver, wherein the side information reception method comprises:
  receiving side information transmitted from a transmitter on a physical control channel;
  receiving a scrambled data signal transmitted from the transmitter on a physical data channel;
  determining a scrambling mode corresponding to the side information in accordance with a predetermined mapping relationship between the side information and the scrambling mode;
  descrambling the data signal in accordance with the scrambling mode corresponding to the side information,
  wherein the side information is used to indicate scrambling modes of number K of scrambled data signal blocks and indicate that no phase rotation is performed on the side information;
  the receiving the scrambled data signal transmitted from the transmitter on the physical data channel comprises: receiving the number K of scrambled data signal transmitted from the transmitter in a-frequency-division multiplexing manner on the physical data channel, wherein number K is a positive integer;
  the determining je scrambling mode corresponding to the side information in accordance with the predetermined mapping relationship between the side information and the scrambling mode comprises: determining number K of scrambling modes corresponding to the side information in accordance with the predetermined mapping relationship between the side information and the scrambling mode; and
  the descrambling the data signal in accordance with the scrambling mode corresponding to the side information comprises: descrambling respectively the number K of scrambled data signal blocks in accordance with the number K of scrambling modes.

15. The side information reception method according to claim 14, wherein receiving the side information transmitted from the transmitter on the physical control channel comprises:
  receiving control information transmitted from the transmitter on the physical control channel,
  wherein the control information at least comprises the side information.

16. The side information reception method according to claim 15, wherein the control information is UCI on which no phase rotation is performed; or the receiving the control information transmitted from the transmitter on the physical control channel comprises: receiving the control information transmitted from the transmitter through the physical control channel on frequency-domain resources at both sides of a frequency-domain resource occupied by the physical data channel; or receiving the control information transmitted from the transmitter through the physical control channel on frequency-domain resources at one side of the frequency-domain resource occupied by the physical data channel.

17. A receiver, comprising a memory, a processor, and a computer program stored in the memory and executed by the processor, wherein the computer program is executed by the processor, to implement the side information reception method according to claim 14.

18. A transmitter, comprising a memory, a processor, and a computer program stored in the memory and executed by the processor, wherein the computer program is executed by the processor to:
  transmit side information to a receiver on a physical control channel; and
  transmit a scrambled data signal to the receiver on a physical data channel, wherein the side information is used to indicate a scrambling mode of the data signal;
  wherein the computer program is further executed by the processor to:
  divide initial data into number K of data signal blocks wherein each of the data signal blocks corresponds to number N of different phase rotations, and number K and number N are each a positive integer;
  select a phase rotation for each data signal block from the number N of different phase rotations;
  scramble the number K of data signal blocks in accordance with the phase rotation for each data signal block, to acquire number K of scrambled data signal blocks; and
  transmit the number K of scrambled data signal blocks to the receiver in a frequency-division multiplexing manner on the physical data channel,
  wherein the side information is used to indicate respectively scrambling modes of the number K of scrambled data signal blocks and indicate that no phase rotation is performed on the side information.

19. The transmitter according to claim 18, wherein the computer program is further executed by the processor to:
  transmit control information to the receiver on the physical control channel,
  wherein the control information at least comprises the side information.

20. The transmitter according to claim 19, wherein
the control information is UCI on which no phase rotation is performed; or the computer program is further executed by the processor to: transmit the control information to the receiver through the physical control channel on frequency-domain resources at two sides of a frequency-domain resource occupied by the physical data channel; or transmit the control information to the receiver through the physical control channel on frequency-domain resources at one side of the frequency-domain resource occupied by the physical data channel.

* * * * *